United States Patent
Yoneyama

(10) Patent No.: US 8,054,368 B2
(45) Date of Patent: Nov. 8, 2011

(54) IMAGING SYSTEM, IMAGING APPARATUS, PORTABLE TERMINAL APPARATUS, ONBOARD APPARATUS, AND MEDICAL APPARATUS

(75) Inventor: Kazuya Yoneyama, Saitama (JP)

(73) Assignee: Fujinon Corporation, Saitama (JP)

( * ) Notice: Subject to any disclaimer, the term of this patent is extended or adjusted under 35 U.S.C. 154(b) by 589 days.

(21) Appl. No.: 12/270,543

(22) Filed: Nov. 13, 2008

(65) Prior Publication Data

US 2009/0128668 A1 May 21, 2009

(30) Foreign Application Priority Data

Nov. 16, 2007 (JP) ................................ P2007-298147

(51) Int. Cl.
*H04N 5/225* (2006.01)
(52) U.S. Cl. ....................................................... 348/335
(58) Field of Classification Search .................. 348/335, 348/222.1, 340, 344
See application file for complete search history.

(56) References Cited

U.S. PATENT DOCUMENTS

| 6,984,206 B2 * | 1/2006 | Kumei et al. ................. 600/176 |
| 7,738,026 B2 * | 6/2010 | Cartlidge ..................... 348/340 |
| 2007/0268376 A1 | 11/2007 | Yoshikawa et al. | |

FOREIGN PATENT DOCUMENTS

| JP | 2004-328506 A | 11/2004 |
| JP | 2006-519527 A | 8/2006 |
| JP | 2007-147951 A | 6/2007 |
| WO | WO 99/67743 A1 | 12/1999 |
| WO | WO 2004/063989 A2 | 7/2004 |
| WO | WO 2006/022373 A | 3/2006 |

* cited by examiner

*Primary Examiner* — Hung Dang
(74) *Attorney, Agent, or Firm* — Birch, Stewart, Kolasch & Birch, LLP

(57) ABSTRACT

There is provided an imaging system configured to include an imaging lens and an imaging device such that the maximum diameter of an effective region of a point image is a size covering three or more pixels of light receiving pixels, the point image being projected onto a light receiving surface through the imaging lens from an intended position. A signal processing unit executes restoration processing on first image data output from the imaging device that images an optical image of a subject through the imaging lens, the restoration processing being executed to generate second image data equivalent to the first image data output from the imaging device when the resolving power of the imaging lens is higher. The imaging lens includes a first lens group, which includes at least one lens and has a positive power, and a second lens group, which includes at least one lens and in which a lens positioned closest to the image side has a negative power, in order from the object side.

21 Claims, 22 Drawing Sheets

EXAMPLE 1

EXAMPLE 1

EXAMPLE 2

EXAMPLE 2

EXAMPLE 3

EXAMPLE 3

COMPARATIVE EXAMPLE

COMPARATIVE EXAMPLE
FIG. 21A
FIG. 21B
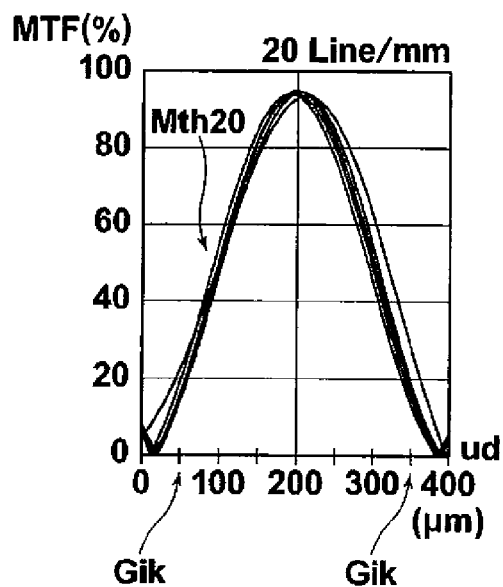
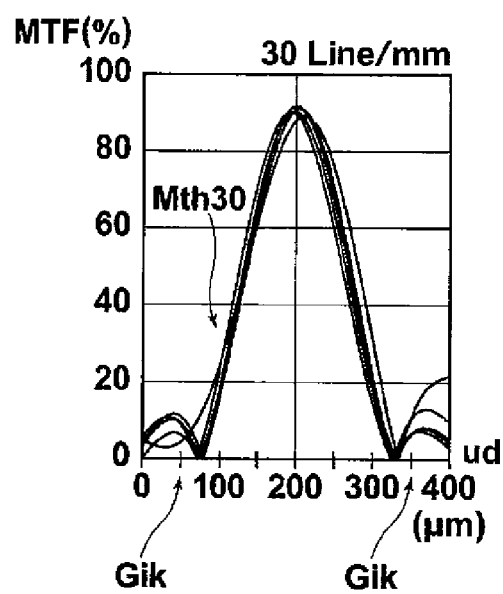
FIG. 21C
FIG. 21D
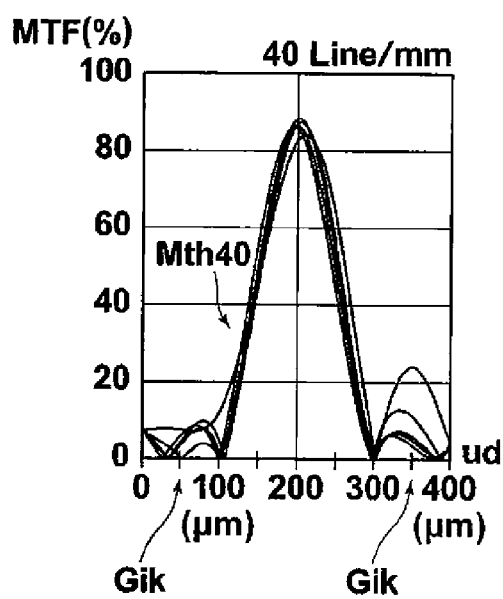
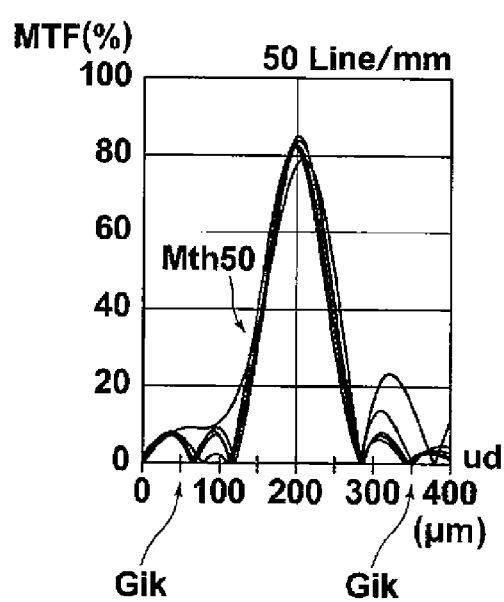

IMAGING SYSTEM, IMAGING APPARATUS, PORTABLE TERMINAL APPARATUS, ONBOARD APPARATUS, AND MEDICAL APPARATUS

This application is based on and claims priority under 35 U.S.C §119 from Japanese Patent Application No. 2007-298147, filed on Nov. 16, 2007, the entire disclosure of which is herein incorporated by reference.

BACKGROUND OF THE INVENTION

1. Field of the Invention

The present invention relates to an imaging system which improves the quality of image data obtained by imaging an optical image of a subject using restoration processing, an imaging apparatus having the imaging system, a portable terminal apparatus having the imaging system, an onboard apparatus having the imaging system, and a medical apparatus having the imaging system.

2. Description of Related Art

An imaging system that forms an optical image of a subject, which is focused on a light receiving surface through an imaging lens, by utilizing an imaging device, such as a CCD or a CMOS device, having the light receiving surface on which a plurality of light receiving pixels are two-dimensionally arrayed is known.

As an example of such an imaging system, an onboard camera or a portable cellular phone camera in which an imaging system having an imaging lens designed such that the depth of field increases is attached directly on a circuit board is known (refer to JP-A-2007-147951). Such an imaging system directly attached to a circuit board is designed to have a small device size since the size is limited.

In addition, among imaging system mounted in onboard cameras or portable cellular phone cameras with high performance, one in which the resolving power of an imaging lens is close to a diffraction limited is also known.

On the other hand, it has been requested to further improve the resolution for an image obtained by using such an imaging system.

In order to improve the resolution of an image obtained by an imaging system, it is necessary to increase the number of light receiving pixels and increase the resolving power of an imaging lens. That is, for example, by increasing the pixel density of light receiving pixels arrayed on a light receiving surface of an imaging device and increasing the resolving power of an imaging lens such that a point image projected onto the light receiving surface through the imaging lens falls within a range of one light receiving pixel, the resolution of the image obtained by using the imaging system can be improved.

Here, increasing the pixel density of light receiving pixels that form the imaging device without making the device size large may be realized relatively easily by an improvement in a technique in recent years.

On the other hand, it is very difficult to improve the resolving power of an imaging lens. That is, in order to make the size of the imaging lens large or improve the resolution of the imaging lens without making a depth of field small, it is necessary to suppress a shape error, an assembly error, and the like of each lens that forms the imaging lens. However, since there is an imaging lens the resolving power of which is already increased up to a level close to the diffraction limited, there is a problem that it is very difficult to increase the resolving power by further improving manufacturing accuracy (for example, machining accuracy, assembly accuracy, and adjustment accuracy).

SUMMARY OF THE INVENTION

An object of an illustrative, non-limiting embodiment of the invention is to provide an imaging system capable of improving the quality of image data obtained by imaging an optical image projected onto a light receiving surface, an imaging apparatus including the imaging system, a portable terminal apparatus including the imaging system, an onboard apparatus having the imaging system, and a medical apparatus including the imaging system.

According to an aspect of the invention, there is provided an imaging system including:

an imaging lens;

an imaging device that has a light receiving surface on which a plurality of light receiving pixels are arrayed in a two-dimensional manner and that forms first image data based on an optical image of a subject projected onto the light receiving surface through the imaging lens and outputs the first image data corresponding to the subject; and signal processing means for executing restoration processing on the first image data, the restoration processing being executed to generate second image data equivalent to the first image data output from the imaging device when a resolving power of the imaging lens is higher, wherein the imaging lens comprises: in order from an object side of the imaging lens, a first lens group which includes at least one lens and has a positive power; and a second lens group which includes at least one lens and in which a lens positioned closest to an image side of the imaging lens has a negative power, and the imaging lens and the imaging device are constructed such that a maximum diameter of an effective region of a point image, which is projected onto the light receiving surface through the imaging lens from any position of X, Y, and Z directions, becomes a size covering three or more pixels of the light receiving pixels.

The imaging lens may be constructed such that a value of MTF is positive. The MTF corresponds to an object located at any position of X, Y, and Z directions distant ten times or more of a focal distance from the imaging lens.

The signal processing means may perform the restoration processing in a condition where a pixel region covering total nine or more pixels including three or more pixels in a vertical direction and three or more pixels in a horizontal direction on the light receiving surface is set as a minimum unit or may perform the restoration processing with a minimum pixel region, which includes the entire effective region of the point image projected onto the light receiving surface, as a minimum unit.

The signal processing means may execute the restoration processing such that the size of the effective region of the point image in an image expressed by the second image data is smaller than the size of the effective region of the point image in an image expressed by the first image data.

The signal processing means may execute the restoration processing using a restoration coefficient corresponding to a state of the point image expressed by the first image data.

The restoration coefficient may be individually calculated for each corresponding imaging system, may be selected corresponding to a state of the point image expressed by the first image data among candidates of restoration coefficient corresponding to respective states of point images classified into a plurality of types, or may be obtained by further correction of the restoration coefficient according to a state of the point image expressed by the first image data, the restoration coefficient being selected corresponding to the state of the point image among candidates of a plurality of types of restoration coefficients corresponding to respective states of point images classified into a plurality of types.

The imaging system may further include restoration coefficient acquisition means for acquiring the restoration coefficient.

The lens surface positioned closest to the image side in the second lens group may have an off-axis inflection point, may have a concave surface on the image side at the on-axis of the lens surface and is convex toward the image side in the periphery of the lens surface, or may satisfy the following conditional expression (1).

$$0.5H < h < H \tag{1}$$

Here, H is an effective radius of the lens surface positioned closest to the image side in the second lens group, and h is a distance from an off-axis inflection point of the lens surface positioned closest to the image side in the second lens group to the optical axis.

Here, when a tangential plane at a point on the lens surface is perpendicular to the optical axis C (Z axis), the point is called an inflection point. Moreover, an inflection point other than the point crossing the optical axis on the lens surface is called an off-axis inflection point.

The imaging lens may be configured to include three single lenses.

The first lens group may be configured to include two single lenses and the second lens group may be configured to include one single lens. One positioned on the object side of the two single lenses included in the first lens group may have a positive power and an object-side surface of the single lens may be convex toward the object side, and further the other one positioned on the image side of the two single lenses may have an image-side surface which is convex toward the image side.

The imaging lens may be configured to include four single lenses.

The first lens group may be configured to include three single lenses and the second lens group may be configured to include one single lens. The first one positioned closest to the object side among the three single lenses included in the first lens group may have a positive power and an object-side surface of the first single lens may be convex toward the object side. The second one adjacent to the first single lens among the three single lenses may have a negative power and an image-side surface of the second single lens may be convex toward the image side, and the third one positioned closest to the image side among the three single lenses may have a positive power.

According to an aspect of the invention, there is provided an imaging apparatus including the imaging system described above.

According to an aspect of the invention, there is provided a portable terminal apparatus including the imaging system described above.

According to an aspect of the invention, there is provided an onboard apparatus including the imaging system described above.

According to an aspect of the invention, there is provided a medical apparatus including the imaging system described above.

The maximum diameter of the effective region of the point image projected onto the light receiving surface may be assumed as a diameter of the effective region in a direction in which the effective region of the point image projected onto the light receiving surface includes a largest number of light receiving pixels, and the "configuration in which the maximum diameter of the effective region of the point image is a size covering three or more pixels" may be assumed as a "configuration in which the effective region has a size covering three or more pixels of light receiving pixels in a direction in which the effective region of the point image includes a largest number of light receiving pixels".

The "effective region of a point image" means a region having a light intensity of $1/e^2$ (about 13.5%) of a peak intensity in the light intensity distribution indicating the point image.

In addition, image restoration processing disclosed in paragraphs (0002 to 0016) of JP-A-2000-123168 may be adopted as the "restoration processing". Moreover, in execution of the restoration processing, for example, a technique disclosed in Non-patent Document "title "Kernel Wiener Filter", Yoshikazu Washizawa and Yukihiko Yamashita, 2003 Workshop on Information-Based Induction Sciences, (IBIS2003), Kyoto, Japan, Nov. 11-12, 2003", which will be described, may be applied.

In addition, the "position distant ten times or more of a focal distance of an imaging lens" means a "position distant ten times or more of the focal distance toward the subject along the optical-axis direction (Z-axis direction) of the imaging lens from a reference position when a position, at which one of lens surfaces forming the imaging lens closest to the subject side (object side) and the optical axis of the imaging lens cross each other, is set as the reference position".

BRIEF DESCRIPTION OF THE DRAWINGS

The features of the invention will appear more fully upon consideration of the exemplary embodiment of the invention, which are schematically set forth in the drawings, in which:

FIG. 12A is a view showing a change in a value of MTF characteristics in a spatial frequency of 20 line 1 mm, FIG. 12B is a view showing a change in a value of MTF characteristics in a spatial frequency of 30 line/mm, FIG. 12C is a view showing a change in a value of MTF characteristics in a spatial frequency of 40 line 1 mm, and FIG. 12D is a view showing a change in a value of MTF characteristics in a spatial frequency of 50 line/mm;

FIG. 14A is a view showing a change in a value of MTF characteristics in a spatial frequency of 20 line 1 mm, FIG. 14B is a view showing a change in a value of MTF characteristics in a spatial frequency of 30 line/mm, FIG. 14C is a view showing a change in a value of MTF characteristics in a spatial frequency of 40 line/mm, and FIG. 14D is a view showing a change in a value of MTF characteristics in a spatial frequency of 50 line/mm;

FIG. 16A is a view showing a change in a value of MTF characteristics in a spatial frequency of 20 line/mm, FIG. 16B is a view showing a change in a value of MTF characteristics in a spatial frequency of 30 line/mm, FIG. 16C is a view showing a change in a value of MTF characteristics in a spatial frequency of 40 line 1 mm, and FIG. 16D is a view showing a change in a value of MTF characteristics in a spatial frequency of 50 line/mm;

FIGS. 21A to 21D are views illustrating a change in a value of MTF characteristics when a light receiving surface is defocused, specifically, FIG. 21A is a view showing a change in a value of MTF characteristics in a spatial frequency of 20 line/mm, FIG. 21B is a view showing a change in a value of MTF characteristics in a spatial frequency of 30 line/mm, FIG. 21C is a view showing a change in a value of MTF characteristics in a spatial frequency of 40 line/mm, and FIG. 21D is a view showing a change in a value of MTF characteristics in a spatial frequency of 50 line 1 mm;

DETAILED DESCRIPTION OF THE EXEMPLARY EMBODIMENTS

Figure 1:
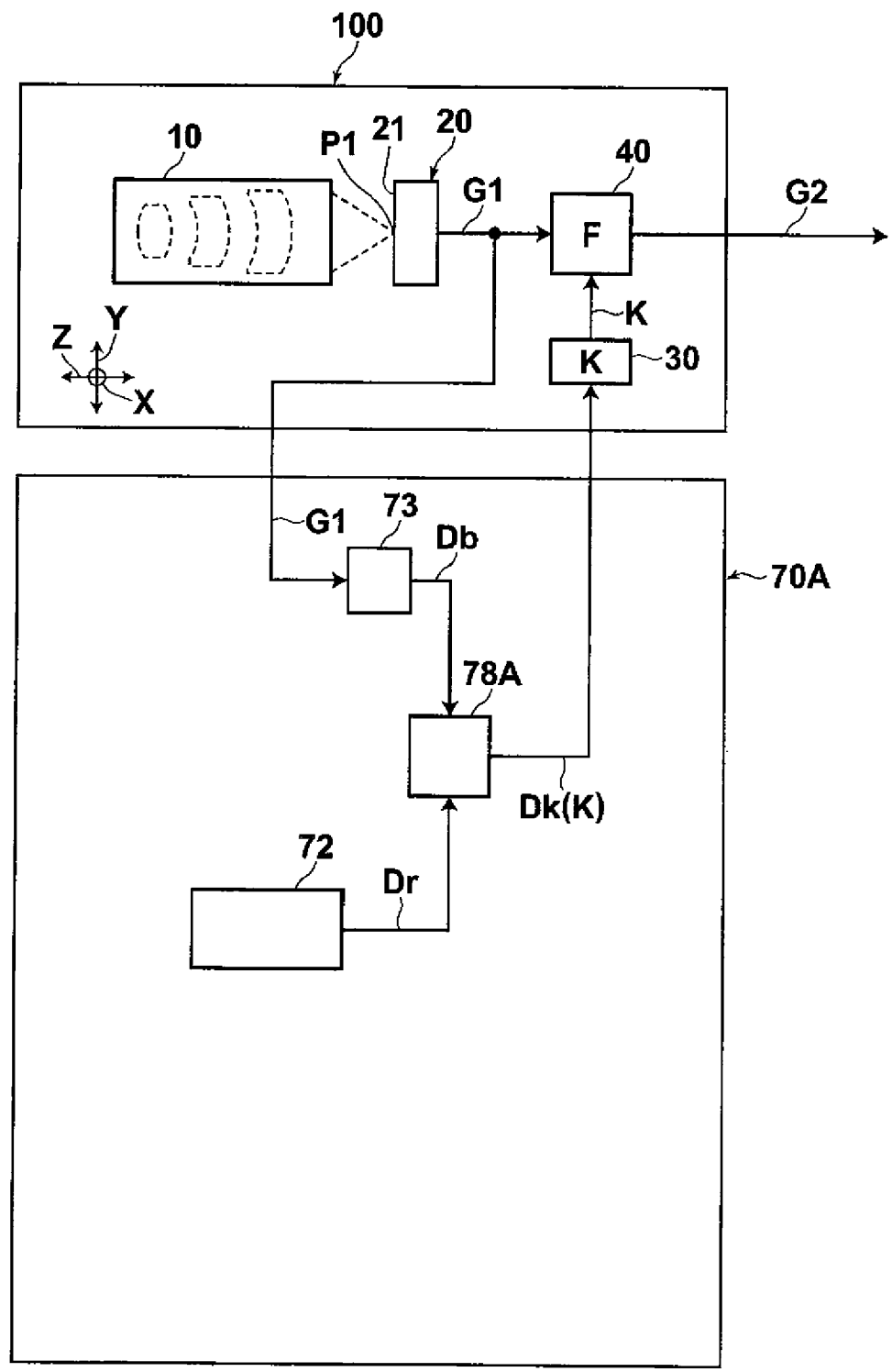
FIG. 1 is a block diagram showing a schematic configuration of an imaging system according to an exemplary embodiment of the invention.

In an imaging system according to an exemplary embodiment of the invention, the imaging lens includes: in order from an object side of the imaging lens, a first lens group which includes at least one lens and has a positive power; and a second lens group which includes at least one lens and in which a lens positioned closest to an image side of the imaging lens has a negative power, and the imaging lens and the imaging device are constructed such that the maximum diameter of the effective region of the point image, which is projected onto the light receiving surface through the imaging lens from any position, becomes a size covering three or more pixels of the light receiving pixels and the restoration processing for generating the second image data equivalent to the first image data output from the imaging device when the resolving power of the imaging lens is higher is executed on the first image data output from the imaging device. Accordingly, the quality of image data obtained by imaging an optical image projected onto the light receiving surface can be improved easily.

That is, in the imaging system according, using an imaging lens with lower resolving power, an image equivalent to an image obtained by imaging an optical image projected through an imaging lens with resolving power higher than the imaging lens can be obtained. For example, the effective region of the point image projected through the imaging lens covers total nine pixels including three pixels in the vertical direction and three pixels in the horizontal direction on the light receiving surface. In addition, since the restoration processing for generating the second image data equivalent to the first image data (that is, first image data output from the imaging device when the resolving power of the imaging lens is higher) output from the imaging device when the effective region of the point image is settled in a region of one pixel on the light receiving surface, for example, is executed on the first image data output from the imaging device by imaging the point image covering total nine pixels, the second image data expressing the same image can be obtained with higher resolution than that of an image expressed by the first image data.

Furthermore, in the imaging system, the restoration processing can also be executed on an optical image projected onto the light receiving surface through the imaging lens from any position. Accordingly, the resolution of the entire image expressed by the first image data can be improved. That is, the resolution of any region in the image expressed by the second image data can be made higher than that of the image expressed by the first image data.

Thus, unlike the related art, the quality of image data can be more easily improved as compared with the case of increasing the resolving power of an imaging lens by improving manufacturing accuracy (for example, machining accuracy, assembly accuracy, and adjustment accuracy) of an imaging system.

Furthermore, when the imaging lens is made to be constructed such that a value of MTF characteristics of an optical image of a subject, which is projected onto the light receiving surface through the imaging lens from any position of X, Y, and Z directions distant ten times or more of a focal distance of the imaging lens, is a positive value, the quality of the first image data expressing the subject at the position distant ten times or more of the focal distance of the imaging lens can be improved more reliably.

Furthermore, when the signal processing means is made to perform the restoration processing in a condition where a pixel region covering total nine or more pixels including three or more pixels in the vertical direction and three or more pixels in the horizontal direction on the light receiving surface is set as a minimum unit, the restoration processing can be performed more reliably.

Furthermore, when the signal processing means is made to execute the restoration processing with a minimum pixel region, which includes the entire effective region of the point image projected onto the light receiving surface, as a minimum unit, it is possible to suppress an increase in amount of operation in the restoration processing and to efficiently execute the restoration processing.

Furthermore, when the signal processing means executes the restoration processing such that the size of the effective region of the point image in the image expressed by the second image data is smaller than the size of the effective region of the point image in the image expressed by the first image data, the quality of image data can be improved more reliably.

Here, when the signal processing means is made to execute the restoration processing by using a restoration coefficient corresponding to a state (hereinafter, referred to as a "blur state of a point image) of a point image in an image expressed by the first image data, the second image data obtained by further correction of the blur state of the point image more accurately can be acquired. As a result, the quality of image data can be improved more reliably.

The reason why the "state of a point image" is called the "blur state of a point image" is that the image quality of a point image projected onto the light receiving surface through the imaging lens and the image quality of a point image expressed by the first image data obtained by imaging the point image deteriorate a little due to an influence of lens aberration and the like as compared with a subject which becomes an object point corresponding to the point image. That is, for examples assuming that a subject is a resolving power chart, the resolution of an image of the resolving power chart projected onto a light receiving surface through an imaging lens and the resolution of an image of the resolving chart expressed by the first image data obtained by imaging the image of the resolving power chart become lower than the resolution of the resolving power chart that becomes the subject. In addition, the "state of a point image" or the "blur state of a point image" mainly indicates a degradation state of the resolution of the point image.

Furthermore, when the restoration coefficient is individually calculated for each corresponding imaging system, the restoration coefficient which can improve the quality of image data can be calculated more accurately.

In addition, when the restoration coefficient is selected corresponding to a blur state of a point image expressed by the first image data among candidates of each restoration coefficient corresponding to each of blur states of point images classified into a plurality of types, the restoration coefficient can be acquired more easily compared with the case in which a restoration coefficient is individually calculated for each corresponding imaging system.

In addition, when the restoration coefficient is obtained by further correction of a restoration coefficient which is selected corresponding to a blur state of the point image expressed by the first image data among candidates of a plurality of types of restoration coefficients corresponding to each of blur states of point images classified into a plurality of types, the restoration coefficient can be acquired more easily while suppressing a reduction in accuracy in calculating the restoration coefficient compared with the case in which a restoration coefficient is individually calculated for each imaging system.

In addition, when the imaging system is made to include the restoration coefficient acquisition means for acquiring the restoration coefficient, the restoration coefficient can be acquired more reliably.

In addition, when the lens surface positioned closest to the image side in the second lens group is made to have an off-axis inflection point, to be concave toward the image side in the middle of the lens surface and convex toward the image side in the periphery of the lens surface, or to satisfy 0.5H<h<H which is the conditional expression (1), telecentricity of the imaging lens can be improved more reliably. As a result the quality of the first image data expressing a subject can be improved more reliably.

Furthermore, when the imaging lens is configured to include only three single lenses in a condition where the first lens group includes two single lenses and the second lens group includes one single lens, one positioned on the object side of the two single lenses included in the first lens group has a positive power and an object-side surface of the single lens is convex toward the object side, and the other one positioned on the image side of the two single lenses has an image-side surface which is convex toward the image side, the telecentricity of the imaging lens can be improved more reliably. As a result, the quality of the first image data expressing a subject can be improved more reliably.

Furthermore, when the imaging lens is configured to include four single lenses in a condition where the first lens group includes three single lenses and the second lens group includes one single lens, the first one positioned closest to the object side among the three single lenses included in the first lens group has a positive power and an object-side surface of the single lens is convex toward the object side, the second one adjacent to the first single lens among the three single lenses has a negative power and an image-side surface of the second single lens is convex surface toward the image side, and the third one positioned closest to the image side among the three single lenses has a positive power, the telecentricity of the imaging lens can be improved more reliably in the same manner as described above. As a result, the quality of the first image data expressing a subject can be improved more reliably.

Each of the imaging apparatus, portable terminal apparatus, onboard apparatus, and medical apparatus of the invention includes the imaging system described above. Therefore, the quality of image data obtained by imaging an optical image projected onto a light receiving surface can be improved more reliably as described above.

Hereinafter, exemplary embodiments of the invention will be described with reference to the accompanying drawings. FIG. 1 is a block diagram showing the schematic configuration of an imaging system according to an exemplary embodiment of the invention.

<Configuration of an Imaging System>

Hereinafter, the configuration of an imaging system will be described.

An imaging system 100 of the invention shown in FIG. 1 includes: an imaging lens 10; an imaging device 20 which has a light receiving surface 21 on which a plurality of light receiving pixels are arrayed in a two-dimensional manner and which images an optical image P1 of a subject projected onto the light receiving surface 21 through the imaging lens 10 and outputs first image data G1 expressing the subject; and a signal processing unit 40 that executes restoration processing on the first image data G1, the restoration processing being executed to generate second image data G2 equivalent to the first image data G1 output from the imaging device 20 when the resolving power of the imaging lens 10 is high.

The imaging lens 10 has a first lens group, which includes at least one lens and has a positive power, and a second lens group, which includes at least one lens and in which a lens positioned closest to the image side has a negative power, in order from the subject side (object side).

The imaging lens 10 and the imaging device 20 are configured such that the maximum diameter of an effective region of the point image P1 is also a size covering three or more pixels, the point image P1 being projected onto the light receiving surface 21 through the imaging lens 10 from any position of X, Y, and Z directions.

Here, the maximum diameter of the effective region of the point image projected onto the light receiving surface 21 is a diameter of the effective region of the point image P1 in a direction in which the effective region of the point image P1 projected onto the light receiving surface 21 includes a largest number of light receiving pixels.

In addition, a direction indicated by arrow Z in FIG. 1 is a direction of an optical axis of the imaging lens 10, and directions indicated by arrows X and Y are directions parallel to the light receiving surface 21.

A restoration coefficient acquisition apparatus 70A which acquires a restoration coefficient K corresponding to a blur state of the point image P1 expressed by the first image data G1 output from the imaging device 20 is provided outside the imaging system 100. The signal processing unit 40 executes the restoration processing F using the restoration coefficient K acquired by the restoration coefficient acquisition apparatus 70A.

Here, the imaging system 100 includes a coefficient storage unit 30 that stores the restoration coefficient K acquired by the restoration coefficient acquisition apparatus 70A. However, the coefficient storage unit 30 may also be provided in the signal processing unit 40. Moreover, the coefficient storage unit 30 does not necessarily need to be provided in the imaging system 100.

The restoration coefficient acquisition apparatus 70A includes: an ideal point image storage unit 72 that stores data Dr, which is either design data regarding a point image when there is no error in an optical system including the imaging lens 10 or ideal point image state data regarding an ideal point image state exceeding it, beforehand; a point image blur state acquisition unit 73 that acquires blurred point image state data Db indicating a blur state of the point image P1 expressed by the first image data G1 output from the imaging device 20; and a restoration coefficient acquisition unit 78A that is input with the blurred point image state data Db indicating the blur state of the point image P1 acquired in the point image blur state acquisition unit 73 and the data Dr which is design data or ideal point image state data stored in the ideal point image storage unit 72, acquires coefficient data Dk indicating the restoration coefficient K corresponding to the blur state of the point image P1 expressed by the first image data G1 by an operation using both the blurred point image state data Db and the data Dr, and makes the restoration coefficient K indicated by the coefficient data Dk stored in the coefficient storage unit 30.

In addition, an imaging lens used in the imaging system of the invention may be adopted even if an optical image is "not focused" correctly on a light receiving surface through the imaging lens without being limited to a case where the optical image is "focused" correctly on the light receiving surface necessarily through the imaging lens. Therefore, in the invention, an explanation will be made assuming that an optical image is "projected" on a light receiving surface through an imaging lens. The state "not focused" is considered as a so-called blurred image. For example, a state where a point image wider than an original point image due to a manufacturing error is generated or a situation where only a point image a design value of which is larger than that of a point image to be originally acquired due to design constraint (size or cost of an optical system) is also included.

In addition, the blurred point image state data Db mainly indicating a degradation state of the resolution of a point image may be set to indicate the size of an effective region of the point image P1 or the brightness distribution (concentration distribution of an image) on the light receiving surface of the point image P1, for example.

<Operation of an Imaging System>

Next, an operation of the above imaging system will be described.

First, an example of a case where a restoration coefficient is calculated by a restoration coefficient acquisition apparatus and the restoration coefficient is stored in a coefficient storage unit will be described.

An optical image of a subject projected onto the light receiving surface 21 through the imaging lens 10 is imaged by the imaging device 20, and the first image data C1 indicating the subject output from the imaging device 20 are input to the point image blur state acquisition unit 73.

The point image blur state acquisition unit 73 to which the first image data G1 is input analyzes a blur state of a point image expressed by the first image data G1 and outputs the analysis result to the blurred point image state data Db.

The restoration coefficient acquisition unit 78A is input with the blurred point image state data Db output from the point image blur state acquisition unit 73 and the data Dr which is the above design data or ideal point image state data stored beforehand in the ideal point image storage unit 72, acquires the restoration coefficient K corresponding to the blur state of the above point image P1 by an operation using both the blurred point image state data Db and the data Dr, and outputs the coefficient data Dk indicating the restoration coefficient K.

The coefficient data Dk indicating the restoration coefficient K and output from the restoration coefficient acquisition unit 78A is input to the coefficient storage unit 30, such that the restoration coefficient K indicated by the coefficient data Dk is stored in the coefficient storage unit 30.

In addition, a DxO analyzer made by DxO Labs (France), which will be described later, is mentioned as an example of realizing functions of the point image blur state acquisition unit 73. In the DxO analyzer, a blur state of the point image P1 projected onto the light receiving surface 21 may be acquired by analyzing the first image data G1 output from the imaging device 20.

<Restoration Processing>

A case in which second image data that expresses an image with higher resolution than an image expressed by first image data is acquired by executing the restoration processing F on the first image data output from the imaging device 20 using the restoration coefficient K stored in the coefficient storage unit 30 will be described. Moreover, in the following explanation, a case in which the restoration processing F is mainly performed on the first image data expressing a point image will be described.

Figure 2A:
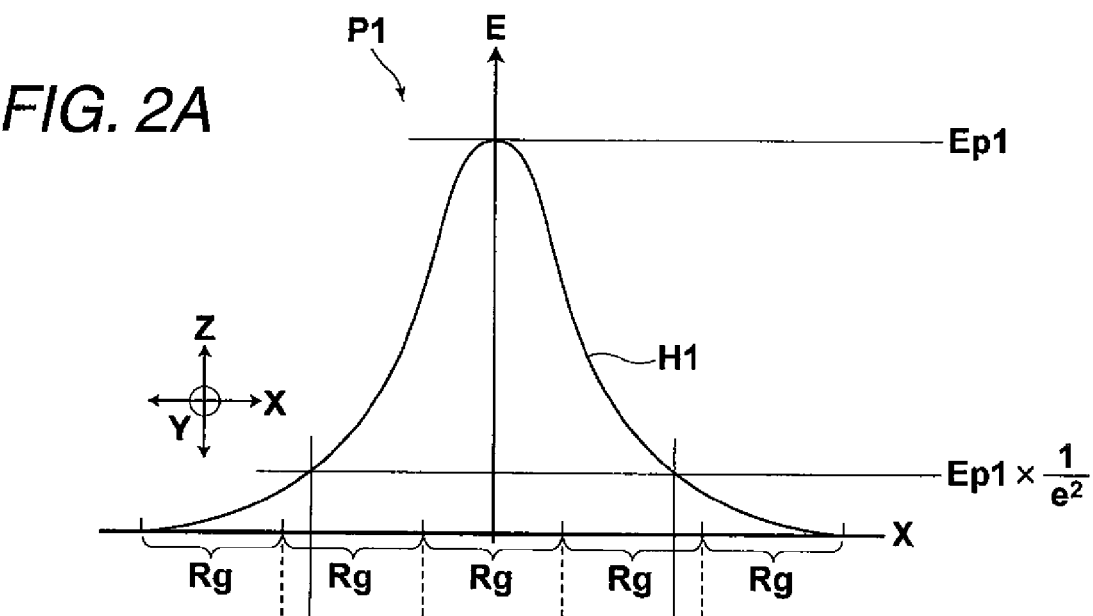
FIG. 2A is a view showing the light intensity distribution of a point image.
Figure 2B:
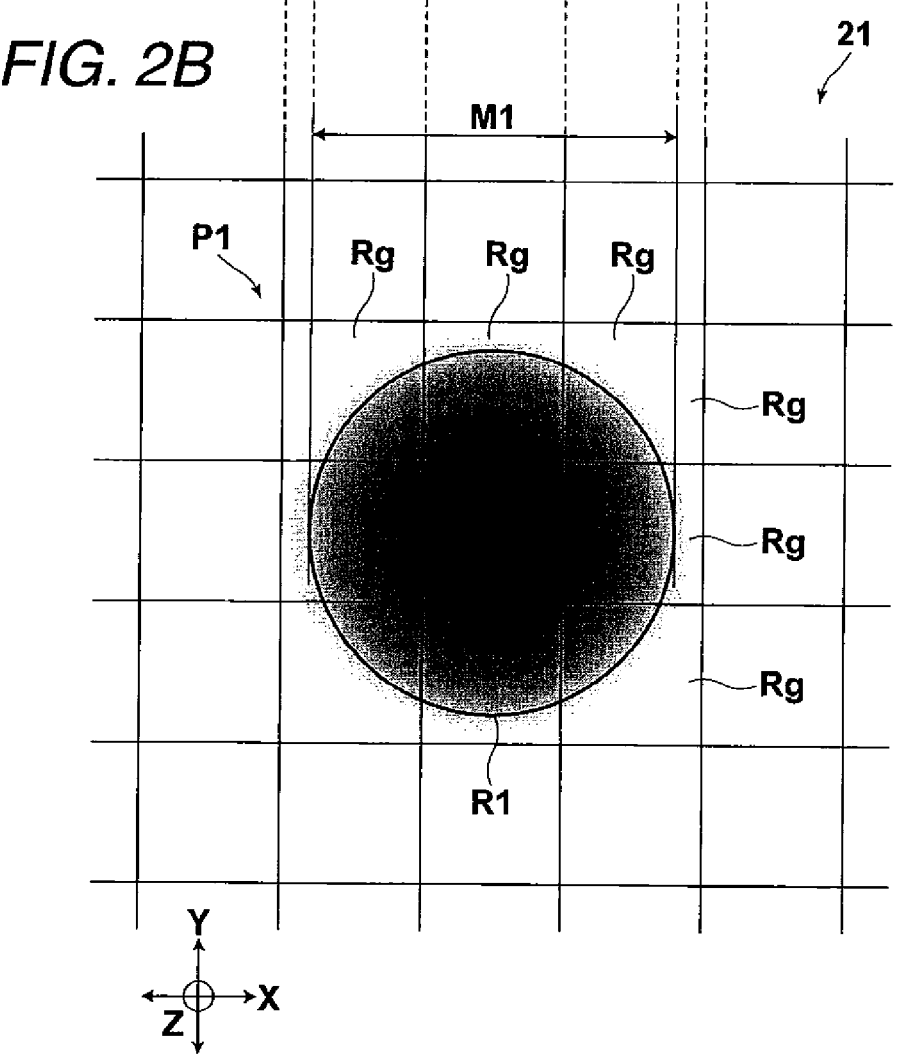
FIG. 2B is a view showing a point image projected onto a light receiving surface.
Figure 3A:
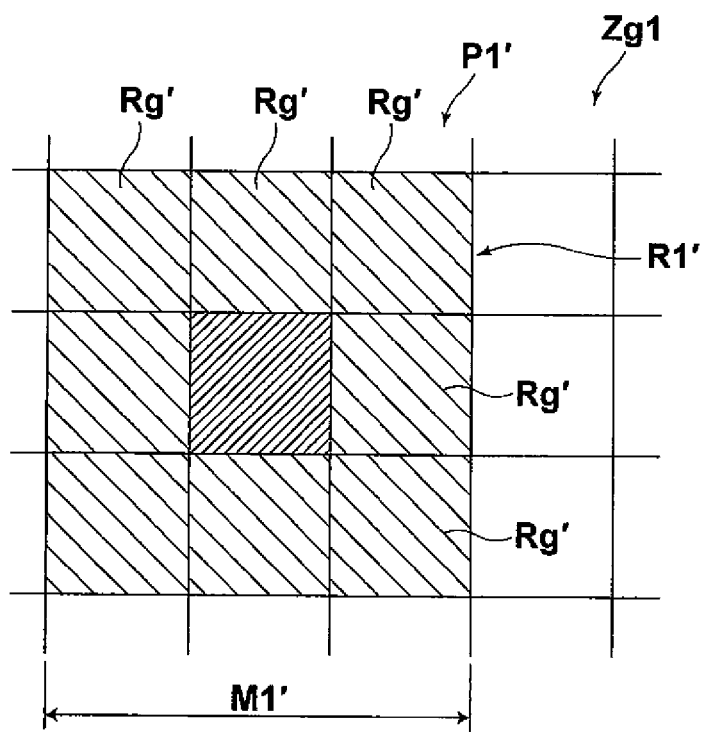
FIG. 3A is a view showing an image of a point image displayed in an image expressed by first image data.
Figure 3B:
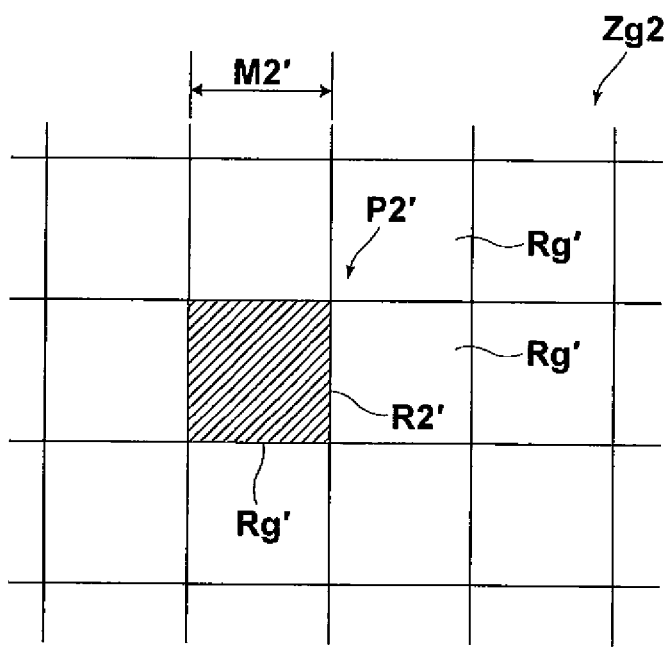
FIG. 3B is a view showing an image of a point image displayed in an image expressed by second image data.

FIG. 2A is a view showing the light intensity distribution of a point image on the coordinates in which a vertical axis indicates a light intensity E and a horizontal axis indicates an X-direction position on a light receiving surface. FIG. 2B is a view showing each pixel region (denoted by reference numeral Rg in the drawing) of a light receiving pixel, which forms a light receiving surface, and a point image projected onto the light receiving surface on the coordinates in which a vertical axis indicates a Y-direction position on the light receiving surface and a horizontal axis indicates an X-direction position on the light receiving surface. FIG. 3A is a view showing an image of a point image displayed in an image expressed by the first image data, and FIG. 3B is a view showing an image of a point image displayed in an image expressed by the second image data. In addition, the sizes of pixel regions (denoted by reference numeral Rg" in the drawing) of the images shown in FIGS. 3A and 3B are equal. In addition, each pixel region Rg of a light receiving pixel that forms the light receiving surface 21 and the pixel region Rg" of an image expressed by the first image data G1 or the second image data G2 are regions corresponding to each other.

Figure 4A:
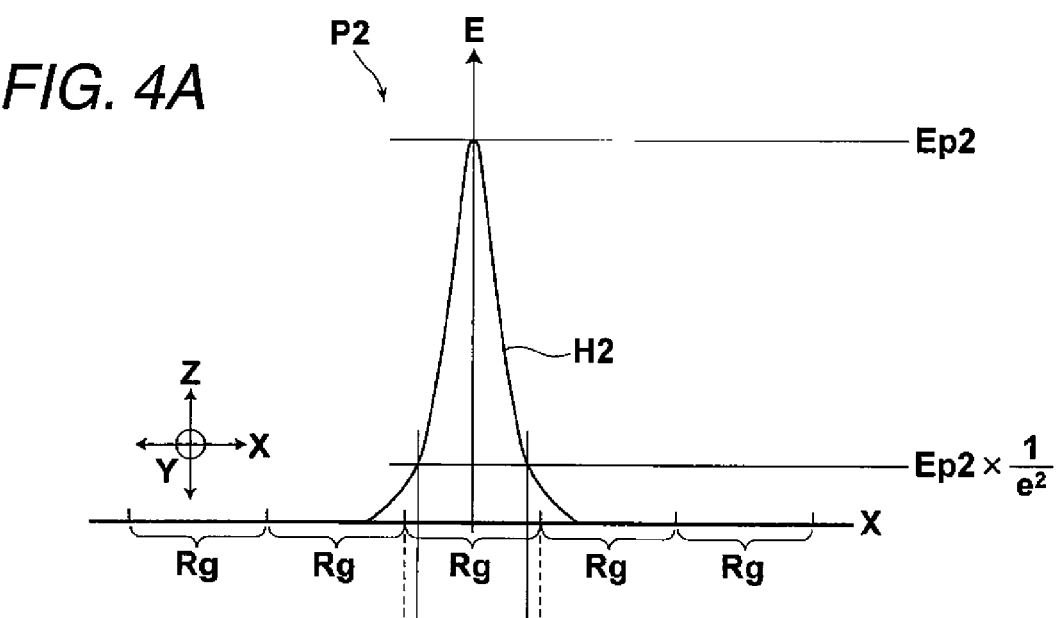
FIG. 4A is a view showing the light intensity distribution of a point image to be projected onto a light receiving surface when the resolving power of an imaging lens is higher.
Figure 4B:
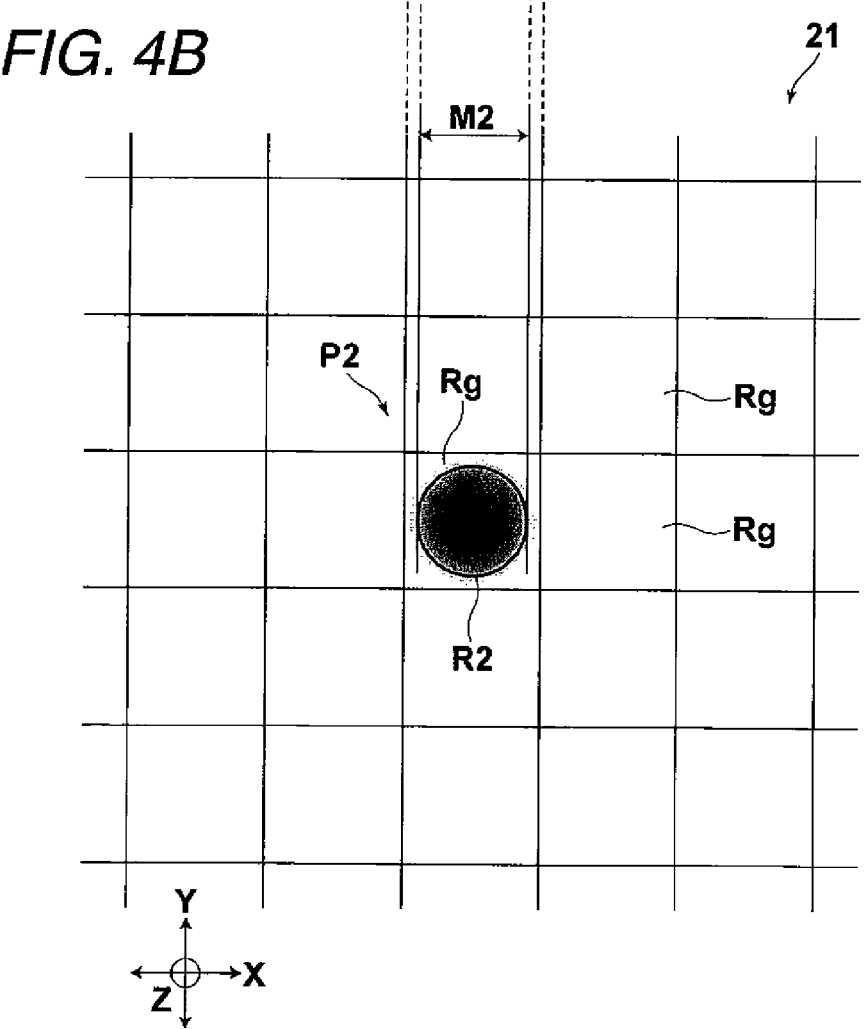
FIG. 4B is a view showing a point image to be projected onto the light receiving surface when the resolving power of the imaging lens is higher.

In addition, FIG. 4A is a view showing the light intensity distribution of a point image, which is to be projected onto the light receiving surface 21 when the resolving power of the imaging lens 10 is high, on the coordinates in which a vertical axis indicates the light intensity E and a horizontal axis indicates the X-direction position on the light receiving surface. In addition, this may be regarded as indicating an ideal point image state regardless of an optical system. FIG. 4B is a view showing each pixel region (denoted by reference numeral Rg in the drawing) of a light receiving pixel, which forms the light receiving surface, and a point image P2, which is to be projected onto the light receiving surface 21 when the resolving power of the imaging lens 10 is high, on the coordinates in which the vertical axis indicates the Y-direction position on the light receiving surface and the horizontal axis indicates the X-direction position on the light receiving surface.

A maximum diameter M1 of an effective region R1 of the point image P1 which is an optical image projected onto the light receiving surface 21 through the imaging lens 10 is a size covering three continuous pixels of light receiving pixels that form the light receiving surface 21, as shown in FIG. 2B. In addition, the effective region R1 is a region covering total nine pixels including three pixels in the vertical direction and three pixels in the horizontal direction on the light receiving surface 21. That is, the effective region R1 is a region occupying nine pixels (3 pixels×3 pixels) of light receiving pixels that form the light receiving surface 21.

In addition, as shown in FIG. 2A, the effective region R1 of the point image P1 is a region having a light intensity of 1/e² or more of a peak intensity Ep1 on a light intensity distribution H1 indicating the point image P1.

The point image P1 projected onto the light receiving surface 21 is imaged by the imaging device 20, and the first image data G1 expressing this point image P1 is output from the imaging device 20.

As shown in FIG. 3A, an image P1" corresponding to the point image P1 displayed in an image Zg1 indicated by the first image data G0 is displayed with an effective region R1" of the image P1" covering nine pixels (3 pixels×3 pixels) of the image with no change.

Then, the signal processing unit 40 to which the image data G1 is input executes the restoration processing F on the first image data G1 using a restoration coefficient K1, obtaining the second image data G2.

As shown in FIGS. 3A and 3B, an effective region R2" of an image P2" of a point image in an image Zg2 indicated by the second image data G2 corresponding to the image P1" of the point image expressed by the first image data G1 is smaller than the effective region R1" of the image P1" of the point image in the image Zg1 indicated by the first image data G1. Accordingly, a maximum diameter M2" (region corresponding to three pixels of the pixel region Rg") of the image P2" of the point image displayed in the image Zg2 becomes also smaller than a maximum diameter M1" (region corresponding to one pixel of the pixel region Rg") of the image P1" of the point image displayed in the image Zg1.

That is, the image P2" of the point image expressed by the second image data G2 shown in FIG. 3B and an image of a point image expressed by the first image data output from the imaging device 20 which has imaged the point image P2 (refer to FIG. 4) to be projected onto the light receiving surface 21 when the resolving power of the imaging lens 10 is high become equal images.

More specifically, the image P2" (refer to FIG. 33) of the point image expressed by the second image data G2 obtained by executing the restoration processing F on the first image data G1, which is output from the imaging device 20 that has imaged the point image P1 (refer to FIGS. 2A and 2B) which is projected onto the light receiving surface 21 through the imaging lens 10 and whose effective region R1 covers nine pixels, using the restoration coefficient K and an image of a point image expressed by the first image data G1 output from the imaging device 20 which has imaged the point image P2 (the maximum diameter M2 of the effective region R2 is included in one pixel region Rg; refer to FIGS. 4A and 4B), which is expected to be projected onto the light receiving surface 21 when the resolving power of the imaging lens 10 is high, are equal images.

In addition, the effective region R2 of the point image P2 included in one pixel region Rg on the light receiving surface 21 shown in FIGS. 4A and 4B is a region having a light intensity of $1/e^2$ or more of a peak intensity Ep2 on a light intensity distribution H2 indicating the point image P2, similar to the case of the point image P1. Here, the effective region R2 of the point image P2 has a size included in one pixel region Rg.

Thus, the resolution of an image expressed by the second image data obtained by performing restoration processing on the first image data may be higher than that of the image expressed by the first image data.

In addition, since the same image as an image obtained when the depth of field of the imaging lens 10 is made large can be obtained by the restoration processing F, it can be said that the restoration processing makes the depth of field of the imaging lens 10 substantially large.

For example, image restoration processing disclosed in paragraphs (0002 to 0016) of JP-A-2000-123168 may be adopted as the restoration processing F of the signal processing unit 40 using the restoration coefficient K corresponding to a state of the point image P1 expressed by the first image data G1.

Although a case of imaging a point image has been described, an optical image of a subject projected onto the light receiving surface 21 through the imaging lens 10 is regarded as a group of point images expressing the subject. Therefore, even if any subject is imaged, the second image data expressing an image can be generated with resolution higher than the image expressed by the first image data by performing restoration processing on the first image data.

<Performance of an Imaging System>

Next, performance of an imaging system configured to include the imaging lens 10 and the imaging device 20, which are used in the above imaging system 100, will be described.

Figure 5:
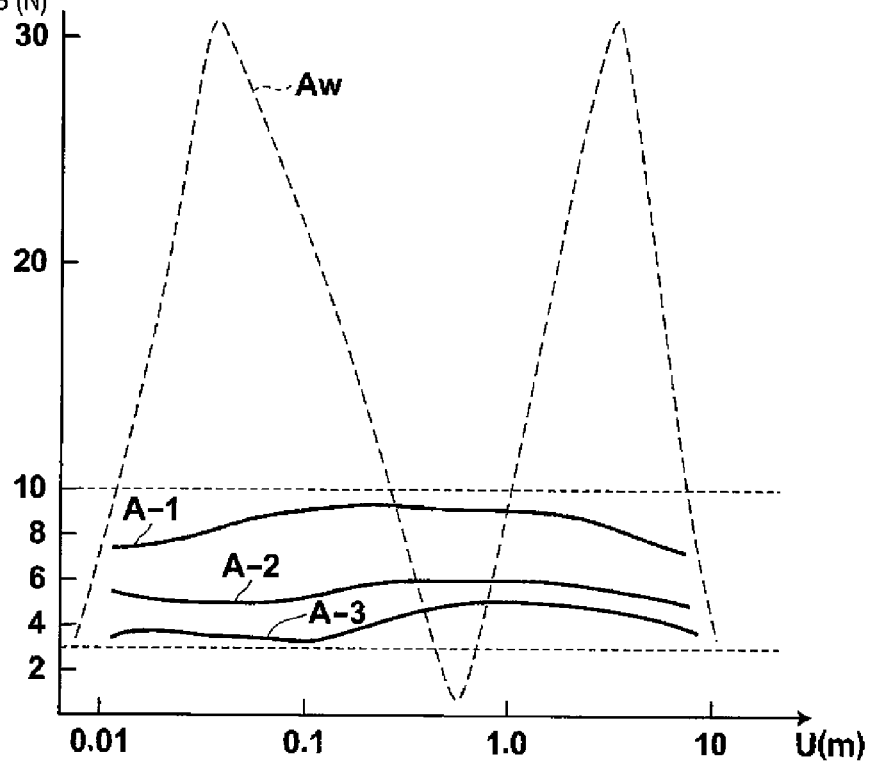
FIG. 5 is a view showing a change in a maximum diameter of an effective region of a point image, which is an optical image of an object point, projected onto a light receiving surface when the object point is made to move in an optical-axis direction.

FIG. 5 is a view schematically showing a change in a maximum diameter of an effective region of a point image, which corresponds to an object point and is projected onto a light receiving surface when the object point is made to move in an optical-axis direction, on the coordinates in which a horizontal axis indicates an optical-axis-direction distance U from an imaging lens to the object point on a logarithmic scale (m) and a vertical direction indicates a length corresponding to the number (N) of pixel regions located continuously on a light receiving surface.

Here, an object point was moved from a position of a near point approximately adjacent to an imaging lens (position adjacent to the imaging lens by about 0.01 m) to a position of a far point approximately infinitely distant from the imaging lens (position distant from the imaging lens by about 10 m).

Three kinds of curves (solid lines) indicated by groups A-1, A-2, and A-3 in FIG. 5 schematically show changes in maximum diameters of effective regions of point images projected onto different specific regions on the light receiving surface 21 through the imaging lens 10 of the imaging system of the invention (specific regions on the light receiving surface having different image heights). In addition, a curved line (dotted line) indicated by a group Aw in FIG. 5 shows a typical change in a maximum diameter of an effective region of a point image projected onto the light receiving surface through an imaging lens used in a known imaging system (for example, an onboard camera, the camera for cellular phones, a portable cellular phone camera, or a camera for medical apparatus).

As can be seen from FIG. 5, the maximum diameter of an effective region of a point image obtained by projecting an object point onto the light receiving surface 21 largely changes from a size corresponding to one pixel to a size corresponding to thirty pixels according to the movement of the object point in the optical-axis direction.

On the other hand, the maximum diameter of the effective region of the point image obtained by projecting the object point onto the light receiving surface 21 through the imaging lens 10 provided in the imaging system 100 of the invention is a size covering three or more pixels and ten pixels or less in all cases of the groups A-1, A-2, and A-3. That is, there is little fluctuation in the size of the effective region of the point image on the light receiving surface regardless of the distance from the imaging lens 10 to the object point and the position (for example, an image height on the light receiving surface) of the projected point image on the light receiving surface. In addition, also in a point image projected from any position of X, Y, and Z directions, i.e., any position in a three-dimensional space, onto the light receiving surface through the imaging lens 10, it can be said that a fluctuation in the size of the effective region of the point image is small.

Figure 6:
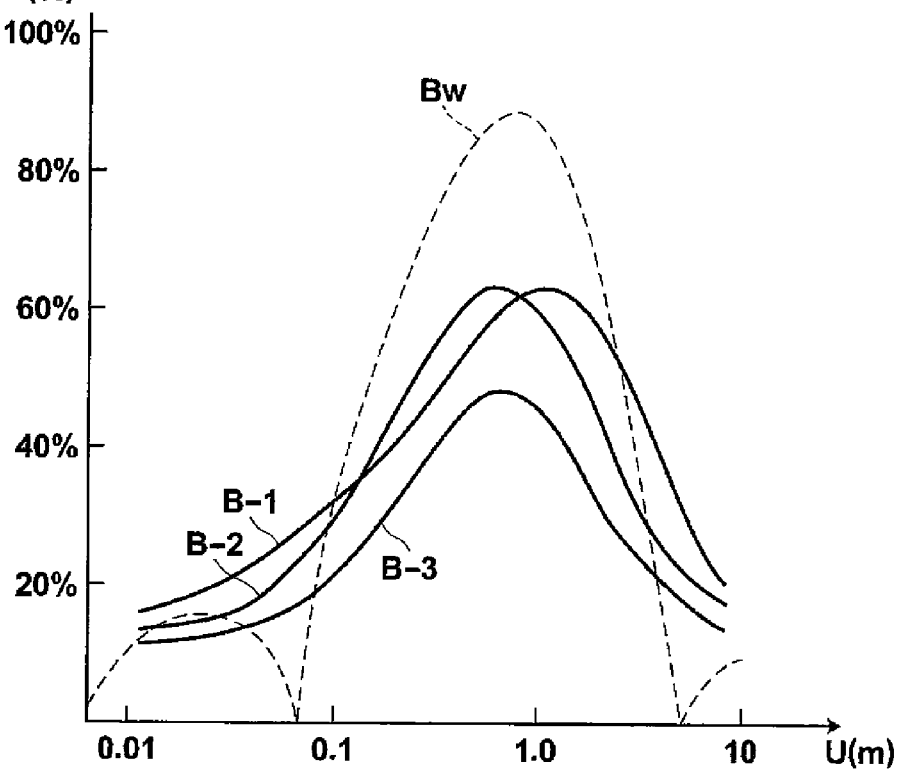
FIG. 6 is a view showing a change in a value (%) of MTF characteristics regarding an optical image of an object point projected onto a light receiving surface when the object point is made to move in an optical-axis direction.

FIG. 6 is a view schematically showing a change in a value (%) of MTF characteristics regarding an optical image of an object point projected onto a light receiving surface when the object point is made to move in an optical-axis direction, on the coordinates in which a horizontal axis indicates an optical-axis-direction distance U from an imaging lens to the object point on a logarithmic scale (m) and a vertical direction indicates the value (%) of MTF characteristics.

Here, an object point was moved from a position of a near point approximately adjacent to an imaging lens (position adjacent to the imaging lens by about 0.01 m) to a position of a far point approximately infinitely distant from the imaging lens (position distant from the imaging lens by about 10 m).

Three kinds of curves (solid lines) regarding the imaging system of the invention indicated by groups B-1, B-2, and B-3 in FIG. 6 schematically show a value (%) of MTF characteristics regarding optical images projected onto different specific regions on the light receiving surface through the imaging lens 10 (specific regions having different image heights). In addition, a curved line (dotted line) indicated by a group Bw in FIG. 6 shows a typical change in a value (%) of MTF characteristics regarding all optical image projected onto a light receiving surface in a known imaging system.

As can be seen from FIG. 6, in a known imaging system, a value (%) of MTF characteristics regarding an optical image projected onto the light receiving surface 21 largely changes from 0% to a value exceeding 80%. In addition, false resolution occurs at an object point located in a region (region at which a value of MTF characteristics is turned up from 0%), which is closer to the imaging lens 10 than a position at which a value of MTF characteristics becomes 0%, of a near point where the imaging lens 10 and the object point are adjacent to each other. In addition, the false resolution also occurs at an object point located in a region (region at which a value of MTF characteristics is turned up from 0%), which is more distant from the imaging lens 10 than a position at which a value of MTF characteristics becomes 0%, of a far point where the imaging lens 10 and the object point are distant from each other.

On the other hand, the value of MTF characteristics regarding an optical image projected onto the light receiving surface 21 through the imaging lens 10 provided in the imaging system 100 of the invention is a size of 10% or more and 60% or less in any case of the groups B-1, B-2, and B-3, and the false resolution does not occur. That is, a fluctuation in a value of MTF characteristics regarding an optical image projected onto a light receiving surface is small and the false resolution does not occur regardless of the distance from the imaging lens 10 to an object point and the position (image height on the light receiving surface) on the light receiving surface of the projected optical image. In addition, it can be said that a fluctuation in the value of the MTF characteristics regarding an optical image projected from any position of X, Y, and Z directions onto the light receiving surface through the imaging lens 10 is also small.

In addition, the imaging lens 10 is constructed such that a value of MTF characteristics of an optical image of a subject, which is projected onto the light receiving surface 21 through the imaging lens 10 from any position of X, Y, and Z directions distant ten times or more of a focal distance (for example, 4 to 5 mm) of the imaging lens 10, is a positive value.

Moreover, in the imaging system 100, the imaging lens and the imaging device may be constructed such that the maximum diameter of an effective region of a point image, which is projected onto a light receiving surface from any position of X, Y, and Z directions of an object space within a range which is restricted to, for example, 10f or more in the Z direction and is restricted up to a predetermined object height in the X and Y directions, becomes a size covering three or more pixels of light receiving pixels which form the light receiving surface of the imaging device.

However, the imaging lens 10 is not necessarily limited to one that satisfies the above condition. An effect of improving the quality of image data output from the imaging device 20 can be obtained as long as the imaging lens 10 and the imaging device 20 are constructed such that the maximum diameter of an effective region of a point image, which is projected onto the light receiving surface 21 through the imaging lens 10 from any position of X, Y, and Z directions, becomes a size covering three or more pixels of light receiving pixels on the light receiving surface.

As described above, according to the imaging system of the invention, lack of the resolution of an image expressed by the first image data output from the imaging system can be supplemented only by performing restoration processing (image processing) on the first image data unlike the related art. That is, since the second image data that expresses an image with desired resolution can be obtained by performing the restoration processing on the first image data, the quality of image data obtained by imaging an optical image projected onto a light receiving surface can be improved easily.

<Operations of a Restoration Coefficient Acquisition Apparatus>

Hereinafter, an operation of the restoration coefficient acquisition apparatus 70A will be described in detail. The following processes are needed as functions of the restoration coefficient acquisition apparatus 70A.

(1) Point image measurement and determination on uniformity within a screen (2) extraction of a coefficient group (restoration coefficient) applying optimal restoration processing (3) recording of an optimal coefficient group. Each of the functions will be described in more detail The process (1) is a function of actually measuring and determining an imaging ability (resolving power) in the combination of each imaging lens and an imaging device. As a means for measuring an optical point image on the basis of an electric signal (first image data) obtained from an imaging device, a DxO analyzer made by DxO Co. in France is commercially available. This uses a concept of expressing blur called B×U that the DxO Co. proposes, which allows to obtain a point image (both an optical point image and a point image after image processing) from an output signal from an imaging device.

Specifically, the DxO analyzer calculates the point image size at an arbitrary point on a light receiving surface of an imaging device by analyzing image data (first image data) obtained by taking an intended designated chart (chart in which a number of black dots are arrayed on white paper) (http://www.dxo.com/jp/image_quality/dxo_analyzer).

In addition, any means for measuring an optical point image may be used as long as the means can calculate a point image from an output signal from an imaging device (that is, a sensor).

On the other hand, the size of a point image corresponding to an optical design value can be calculated with a tool which designed the optical system. Accordingly, by comparing the size of a "design value point image" obtained in the calculation with the size of a "measured point image" measured in a measuring apparatus, such as the DxO analyzer, it can be determined how far the measured point image deviates from the design value. For example, in many cases, the size of the measured point image when there is an assembly error in an optical component becomes larger than the design value. In addition, the shape or brightness distribution of an effective region of a point image projected onto a light receiving surface of an imaging device is originally symmetrical with respect to a point. However, when the imaging lens is inclined or the axis deviates, front blur and back blur, a so-called "single-sided blur state" partially occurs in the shape or the brightness distribution. Such deviation from a design value is calculated by comparing the "design value point image" with the "measured point image", such that a determination on whether or not it can be said as the design value may be further made. In addition, even if attention is not made to the design value point image, it is also possible to define an ideal state arbitrarily, compare the ideal state ("ideal point image") with a "measured point image", and determine the difference.

The process (2) is a step of executing restoration processing based on a kernel Wiener filter and obtaining a coefficient group (restoration coefficient) for bringing the "measured point image" close to the "design value point image" or the "ideal point image" by calculation. The kernel Wiener filter is widely used in a technique of estimating an original signal from an observed signal included in a noise when the original signal is observed together with the noise through predetermined filtering, as disclosed in the document "title "Kernel Wiener Filter", Yoshikazu Washizawa and Yukihiko Yamashita, 2003 Workshop on Information-Based Induction Sciences, (IBIS2003), Kyoto, Japan, Nov. 11-12, 2003". Here, assuming that the original signal is a "photographed object", the filtering is "imaging lens+imaging device", the observed signal is an "image signal (first image data)", and the noise is a "difference between a design value point image (or an ideal point image) and a measured point image", the "photographed object" can be estimated by application of the kernel Wiener filter.

If there is no error factor in the "imaging lens+imaging device" of an actual object, a photographed object becomes an image signal and an ideal "image signal (second image data)" is theoretically acquired after the restoration processing. Practically, there is a measurement error in the process (1) and a noise component partially remains without being completely removed. However, it is clear that a measured point image becomes similar to a design value point image or an ideal point image, and the quality of a final image is improved.

Specifically, even if an optical point image is larger than a design value or is not uniform on an imaging surface due to a certain error factor, performance allowable in practical use can be secured by making the point image uniform on the imaging surface or correcting the point image small by restoration processing. In addition, even in an optical system which is constructed not to avoid low performance (optical point image is large compared with an element pitch) in terms of design as well as an error factor in manufacture, the optical performance can be seemingly improved by correcting the point image. By pursuing an improvement in optical performance in appearance, it becomes possible to exceed the critical resolution theoretically indicated. This is very useful in considering the tendency of miniaturization of a pixel size in recent years.

Here, the critical resolution is set as a size of the Airy disk, and a radius Re of an effective region (peak intensity×($1/e^2$)) of a point image intensity of an aplanatic lens and a radius Re making the intensity zero are defined by the following expressions. Pixel pitches of latest CMOS devices used as imaging devices are 2.2 microns and 1.75 microns, and it is expected that 1.4 microns and 1.0 microns will be the mainstream from now on. As an example, Re and Rc are calculated as follows in the case of F2.8 and a wavelength of 550 nm.

$Re$ (radius of an effective region of a point image intensity)=$0.82\lambda F$=$0.82\times 2.8\times 550\times 0.001$=$1.26$ microns (diameter of the effective region of the point image intensity=2.52 microns)

$Rc$ (radius making the point image intensity zero)= $1.22\lambda F$=$1.22\times 2.8\times 550\times 0.001$=$1.88$ microns (diameter making the point image intensity zero=3.76 microns).

In this case, the pixel pitch is already over the diffraction limited.

Although non-aberration is assumed in the diffraction limited, the non-aberration is not realized in an actual optical system. Particularly when requests of miniaturization and reduction in cost are considered, the aberration remains rather and accordingly, the compromised performance cannot be avoided. The restoration processing using the kernel Wiener filter can improve the quality of a final image up to a practical degree in such a situation.

Although it is assumed that the restoration processing is executed on a specific image surface or at the extreme vicinity (range of front blur and back blur), it is also possible to extend the focal depth if restoration processing for eliminating a difference between a measured point image and a design value point image in a number of image surface groups in the defocusing direction corresponding to a fluctuation in photographing distance is considered.

Regarding execution of the restoration processing, it is desirable to perform optimal restoration processing for every combination of "imaging lens+imaging device" since a noise component to be removed varies according to each "imaging lens+imaging device". In this case, preferably, the algorithm of restoration processing itself is equal and a "coefficient group" referred herein is optimal.

The process (3) is a step of actually combining the "optimal coefficient group" with a set of the "imaging lens+imaging device". In order to do so, it is necessary to store a coefficient group for executing the optimal restoration processing in a predetermined recording medium and to add the coefficient group to the set of "imaging lens+imaging device". Accordingly, a recording process is required.

An optical point image is corrected in a form suitable for the application by using an imaging system as a set of "imaging lens+imaging device+recording medium", and an image with satisfactory quality can be obtained eventually. Specifically, even if the resolving power is not satisfactory for a certain reason (manufacturing tolerance and original design value are low), a means capable of obtaining satisfactory resolving power as an image after processing is provided. In addition, a focal depth magnifying means suitable for the characteristics of each set of imaging lens and imaging device may also be provided.

<Modification of a Restoration Coefficient Acquisition Apparatus>

Hereinafter, a modification of the restoration coefficient acquisition apparatus will be described.

The restoration coefficient acquisition apparatus which makes the restoration coefficient K1, which corresponds to a blur state of a point image expressed by the first image data output from the imaging device, stored in the coefficient storage unit 30 may be constructed like a restoration coefficient acquisition apparatus 70B of a second example or a restoration coefficient acquisition apparatus 70C of a third example, which will be described below and is different from the restoration coefficient acquisition apparatus 70A in the first example.

Figure 7:
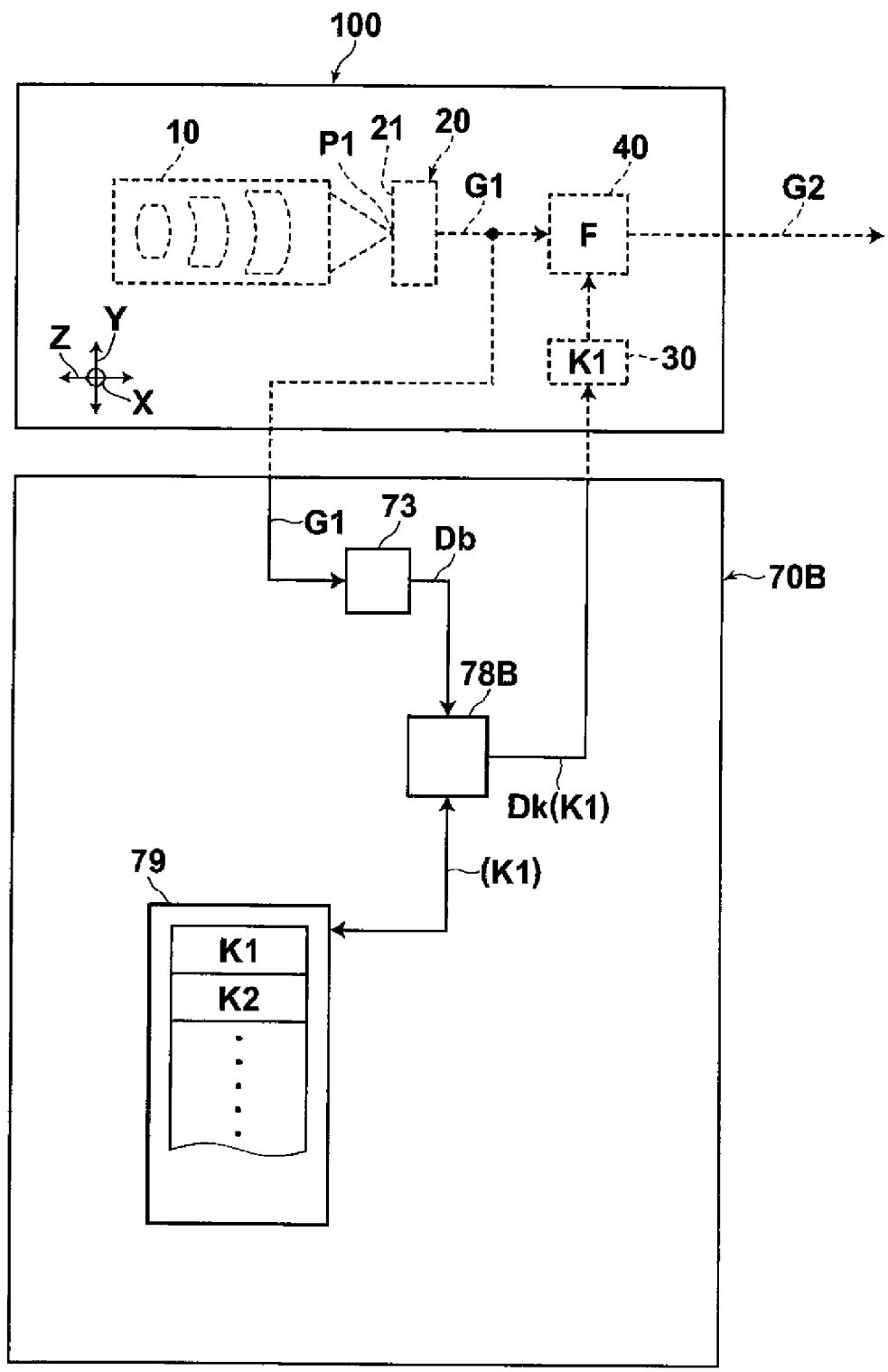
FIG. 7 is view showing a restoration coefficient acquisition apparatus in a second example.

FIG. 7 is a view showing the restoration coefficient acquisition apparatus 70B of the second example that stores a restoration coefficient, which is selected corresponding to a blur state of a point image expressed by the first image data among candidates of each restoration coefficient corresponding to each of blur states of point images classified into a plurality of types.

As shown in FIG. 7, the restoration coefficient acquisition apparatus 70B includes: a candidate coefficient storage unit 79 that stores candidates K1, K2, . . . of each restoration coefficient corresponding to each of blur states of point images classified into a plurality of types beforehand; a point image blur state acquisition unit 73 that acquires a blur state of the point image P1 projected onto the light receiving surface 21 through the imaging lens 10; and a restoration coefficient acquisition unit 78B that selects a restoration coefficient (for example, K1), which corresponds to a blur state of the point image P1 expressed by the first image data G1, among the restoration coefficient candidates K1, K2, . . . and makes the restoration coefficient K1 stored in the coefficient storage unit 30.

In the restoration coefficient acquisition apparatus 70B, the point image blur state acquisition unit 73 acquires the blurred point image state data Db indicating a blur state of the point image and the restoration coefficient acquisition unit 78B selects a restoration coefficient (for example, K1), which corresponds to a blur state of the point image P1 expressed by the blurred point image state data Db, among the restoration coefficient candidates K1, K2, . . . stored in the candidate coefficient storage unit 79 and outputs coefficient data Dk indicating the restoration coefficient K1 to the coefficient storage unit 30.

That is, a restoration coefficient selected corresponding to a blur state of a point image expressed by the first image data G1 among the candidates K1, K2, . . . of each restoration coefficient corresponding to each of blur states of point images classified into a plurality of types is stored in the coefficient storage unit 30.

Figure 8:
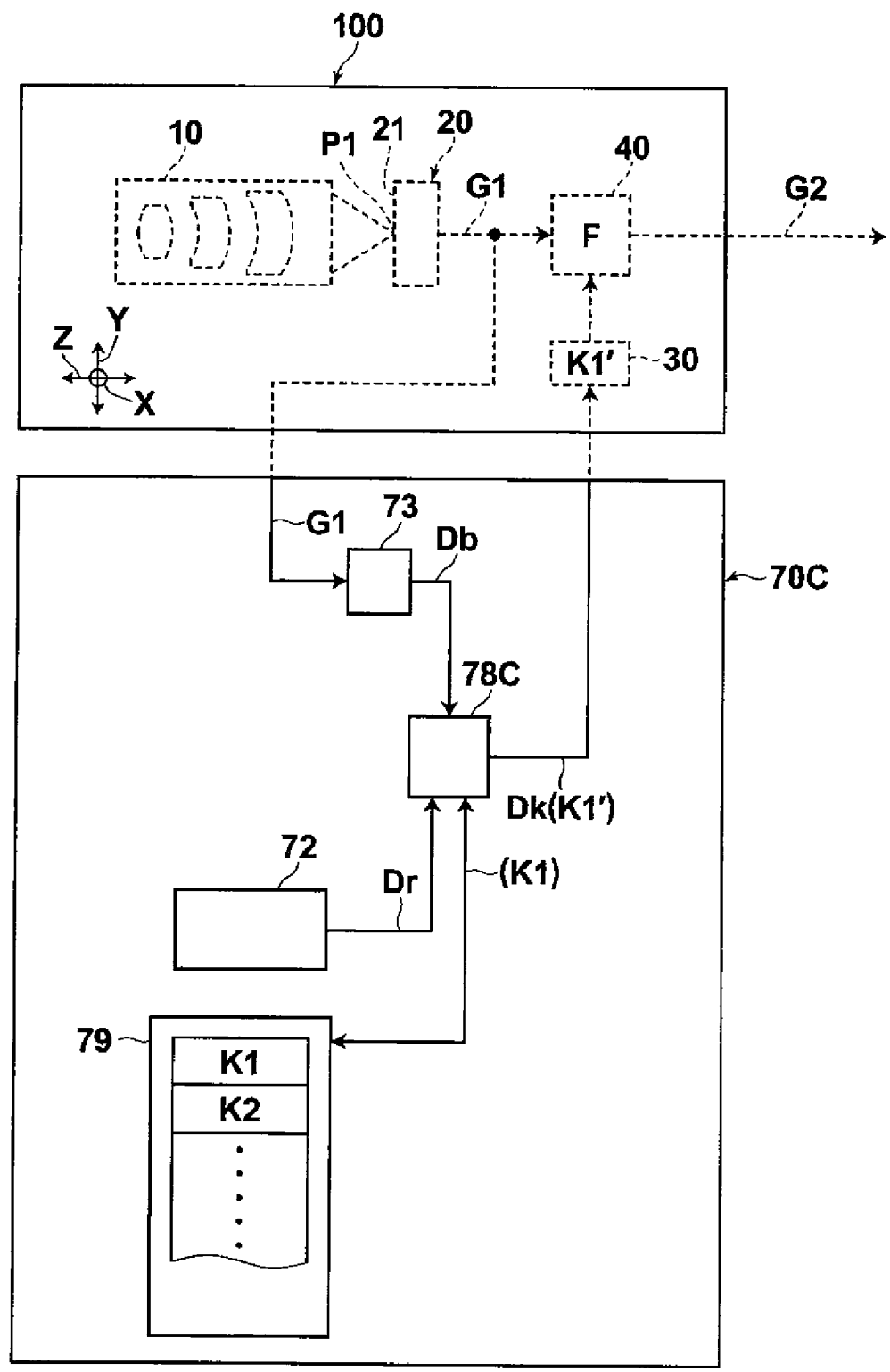
FIG. 8 is view showing a restoration coefficient acquisition apparatus in a third example.

In addition, FIG. 8 shows the restoration coefficient acquisition apparatus 70C of the third example that makes a correction-completed restoration coefficient obtained by further correcting a restoration coefficient, which is selected corresponding to a blur state of the point image expressed by the first image data among candidates of a plurality of types of restoration coefficients corresponding to each of blur states of point images classified into a plurality of types, stored in the coefficient storage unit.

As shown in FIG. 8, the restoration coefficient acquisition apparatus 70C includes: a candidate coefficient storage unit 79 that stores candidates K1, K2, . . . of each restoration coefficient corresponding to each of blur states of point images classified into a plurality of types beforehand; an ideal point image storage unit 72 that stores data Dr, which is either ideal point image state data or design data regarding the ideal point image P1 projected onto the light receiving surface 21 through an imaging lens with high resolving power, beforehand when the resolving power of the imaging lens 10 is high; a point image blur state acquisition unit 73 that acquires a blur state of the point image P1 projected onto the light receiving surface 21 through the imaging lens 10; and a restoration coefficient acquisition unit 78C that selects a restoration coefficient (for example, K1) corresponding to a blur state of the point image P1 among the restoration coefficient candidates K1, K2, . . . , acquires coefficient data Dk (K1") indicating a correction-completed restoration coefficient K1" obtained by correcting the restoration coefficient K1 by an operation using the blur state of the point image P1 and the data Dr which is ideal point image state data or design data of a point image stored beforehand in the ideal point image storage unit 72, and makes the correction-completed restoration coefficient K1" indicated by the coefficient data Dk (K1") stored in the coefficient storage unit 30.

In the restoration coefficient acquisition apparatus 70C, the point image blur state acquisition unit 73 acquires blur state data indicating the blur state of the point image P1 projected onto the light receiving surface 21 through the imaging lens 10. The restoration coefficient acquisition unit 78B selects a restoration coefficient (for example, K1), which corresponds to the blur state of the point image P1, among the restoration coefficient candidates K1, K2, . . . stored in the candidate coefficient storage unit 79. In addition, the correction-completed restoration coefficient K1", which is obtained by correcting the restoration coefficient K1 by the operation using the blur state of the point image P1 and the data Dr which is ideal point image state data or design data of the point image stored beforehand in the ideal point image storage unit 72, is acquired and the correction-completed restoration coefficient K1" is stored in the coefficient storage unit 30.

That is, the correction-completed restoration coefficient K1" obtained by correcting a restoration coefficient (for example, K1), which is selected corresponding to a blur state of the point image P1 expressed by the first image data G1 among a plurality of kinds of restoration coefficient candidates corresponding to each of blur states of point images classified into a plurality of types, according to the blur state is stored in the coefficient storage unit 30.

Figure 9:
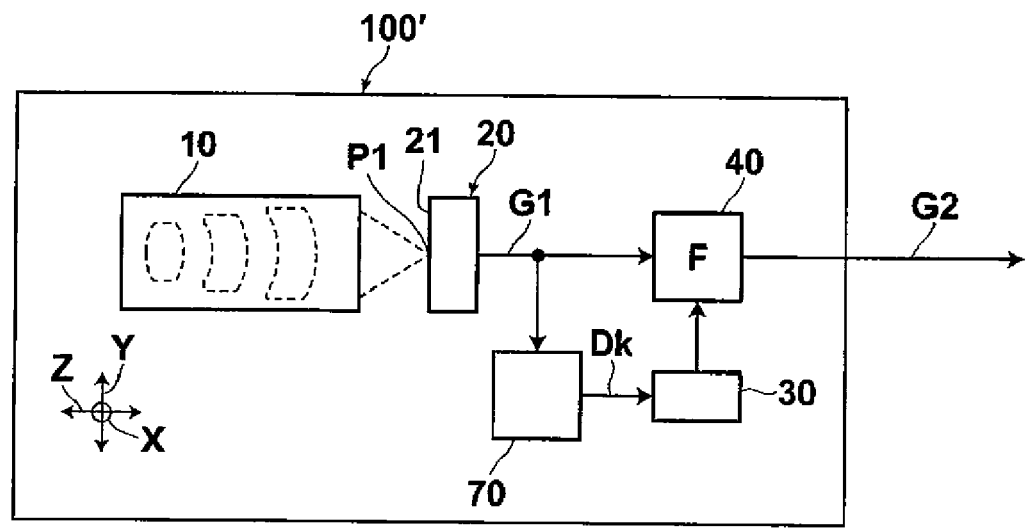
FIG. 9 is a view showing an imaging system including a restoration coefficient acquisition apparatus.

Moreover, as shown in FIG. 9, the imaging system of the invention may also be an imaging system 100' in which a restoration coefficient acquisition apparatus 70, which has the same function as the restoration coefficient acquisition apparatus 70A, 70B, or 70C, or the coefficient storage unit 30 is provided in a housing of the imaging system.

Figure 10:
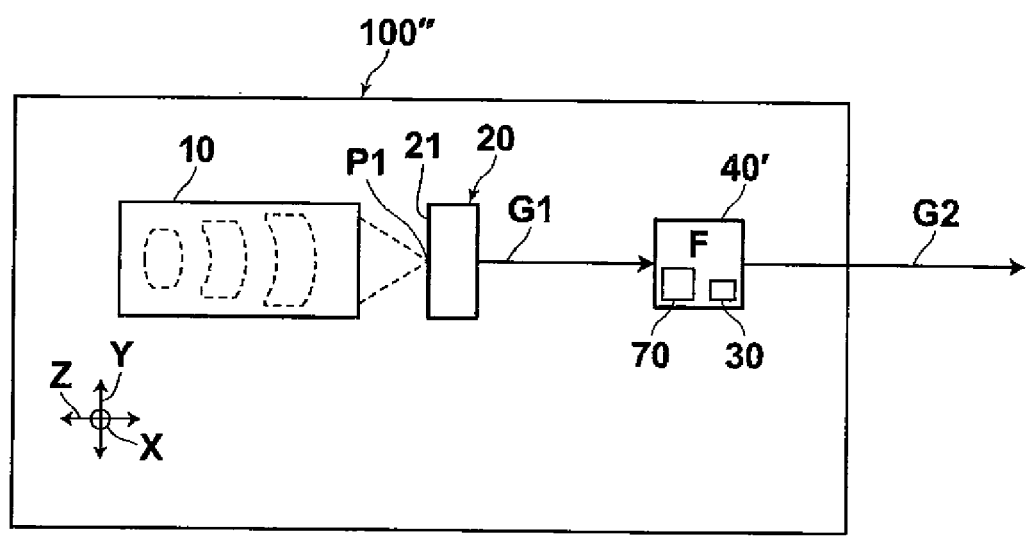
FIG. 10 is a view showing an imaging system including a restoration coefficient acquisition apparatus in a signal processing unit.

Furthermore, as shown in FIG. 10, the imaging system of the invention may also be an imaging system 100" in which a signal processing unit 40" including the restoration coefficient acquisition apparatus 70 or the coefficient storage unit 30 is provided. That is, the signal processing unit 40" may be made to also function as the restoration coefficient acquisition apparatus 70.

<Modification of Each Constituent Element>

Hereinafter, modifications of constituent elements in the imaging system will be described.

The signal processing unit may execute the restoration processing in a condition where a pixel region covering total nine or less pixels including three or less pixels in a vertical direction and three or less pixels in a horizontal direction is set as a minimum unit without being limited to a case where the restoration processing is executed in a condition where a pixel region covering total nine or more pixels including three or more pixels in the vertical direction and three or more pixels in the horizontal direction on the light receiving surface is set as a minimum unit.

In addition, the signal processing unit may also be made to calculate a restoration coefficient in other methods without being limited to a case where the restoration coefficient is calculated by an operation using the first image data expressing the blur state of the point image.

In addition, the signal processing unit may execute the restoration processing with a pixel region, which includes the whole effective region but is not the minimum, as a minimum unit without being limited to a case where the restoration processing is executed in a condition where a minimum pixel region including the entire effective region of a point image projected onto a light receiving surface is set as a minimum unit.

Furthermore, the signal processing unit may execute the restoration processing such that the size of an effective region of a point image in an image expressed by first image data is equal to or larger than the size of an effective region of a point image in an image expressed by second image data without being limited to a case where the restoration processing is executed such that the size of the effective region of the point image in the image expressed by the second image data is smaller than the size of the effective region of the point image in the image expressed by the first image data.

Moreover, in apparatuses requested to have a large depth of field, such as an imaging apparatus, a portable terminal apparatus, an onboard apparatus, and a medical apparatus of the invention including the above-described imaging system, the quality of image data obtained by imaging an optical image projected onto the light receiving surface of the imaging system provided in each apparatus can be easily improved as described above.

Figure 22:
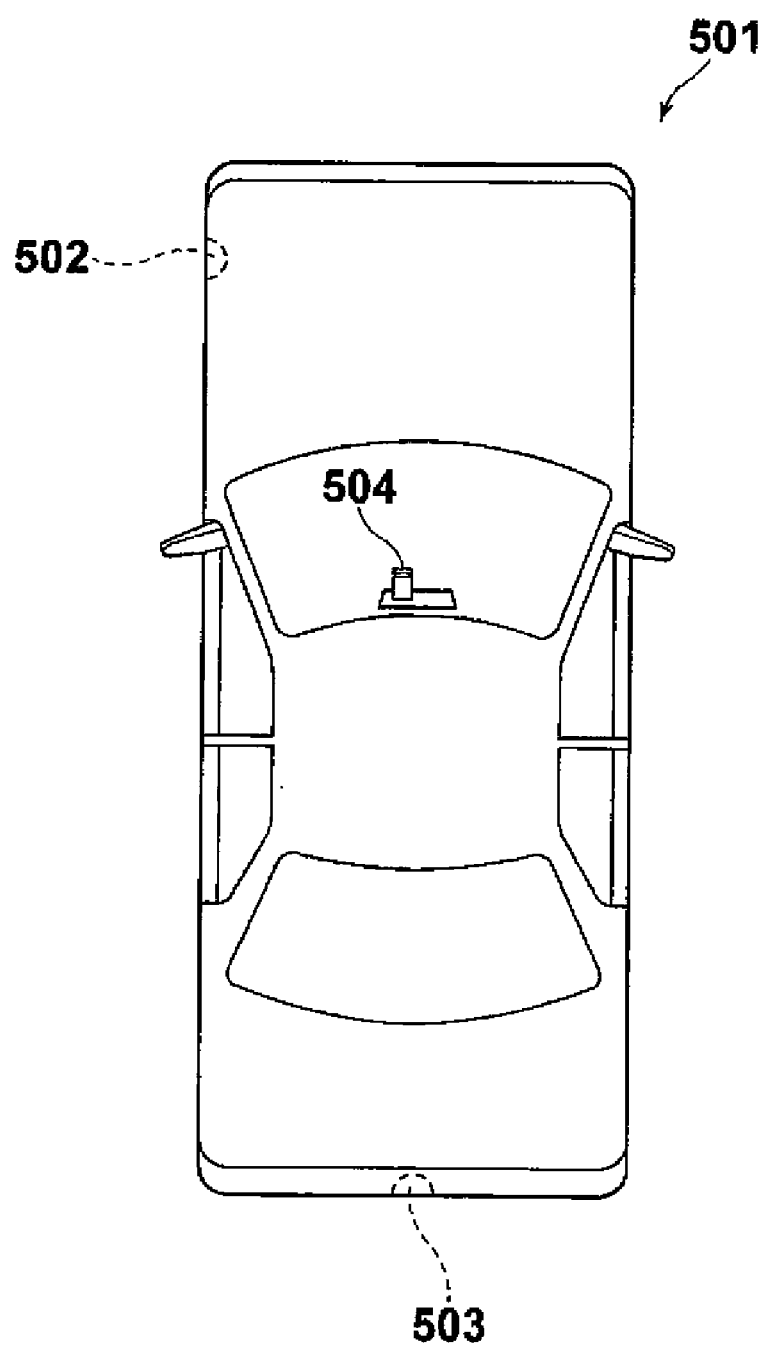
FIG. 22 is a view showing an automobile in which an onboard apparatus including an imaging system is mounted.

FIG. 22 is a view showing an automobile in which an onboard apparatus including an imaging system is mounted.

As shown in FIG. 22, onboard apparatuses 502 to 504 each including the imaging system of the invention may be used in a state mounted in an automobile 501 and the like. The automobile 501 includes: the onboard apparatus 502 which is a camera provided outside the vehicle in order to image a blind zone of a side surface on a front passenger side; the onboard apparatus 503 which is a camera provided outside the vehicle in order to image a blind zone on a rear side of the automobile 501; and the onboard apparatus 504 which is a camera attached to a back surface of a room mirror and provided inside the vehicle in order to image the same viewing field range as a driver.

Figure 23:
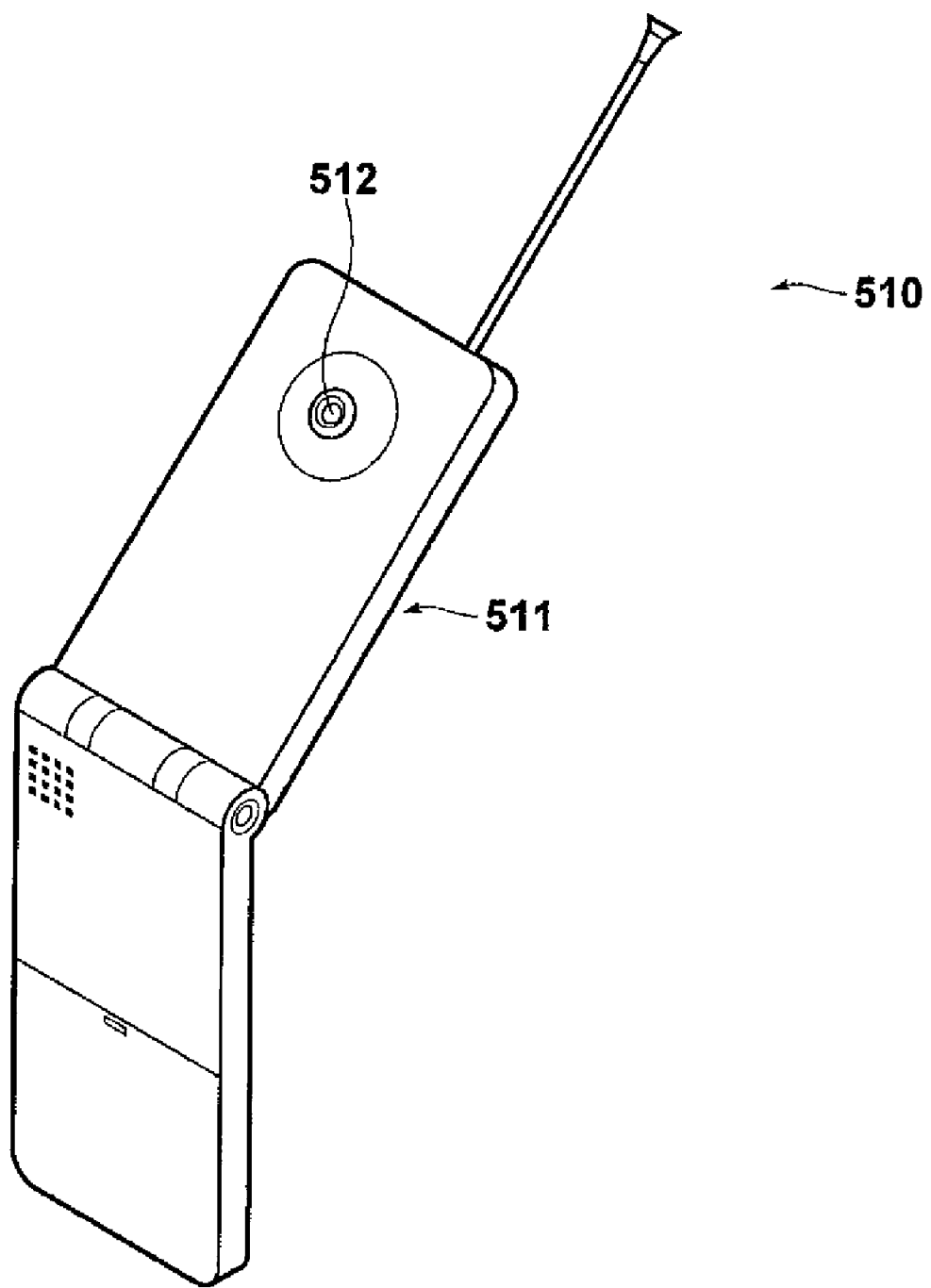
FIG. 23 is a view showing a portable cellular phone which is a portable terminal apparatus including an imaging system.

FIG. 23 is a view showing a portable cellular phone which is a portable terminal apparatus including an imaging system.

As shown in the drawing, a portable cellular phone 510 has an imaging system 512 provided in a housing 511 of the portable cellular phone.

Figure 24:
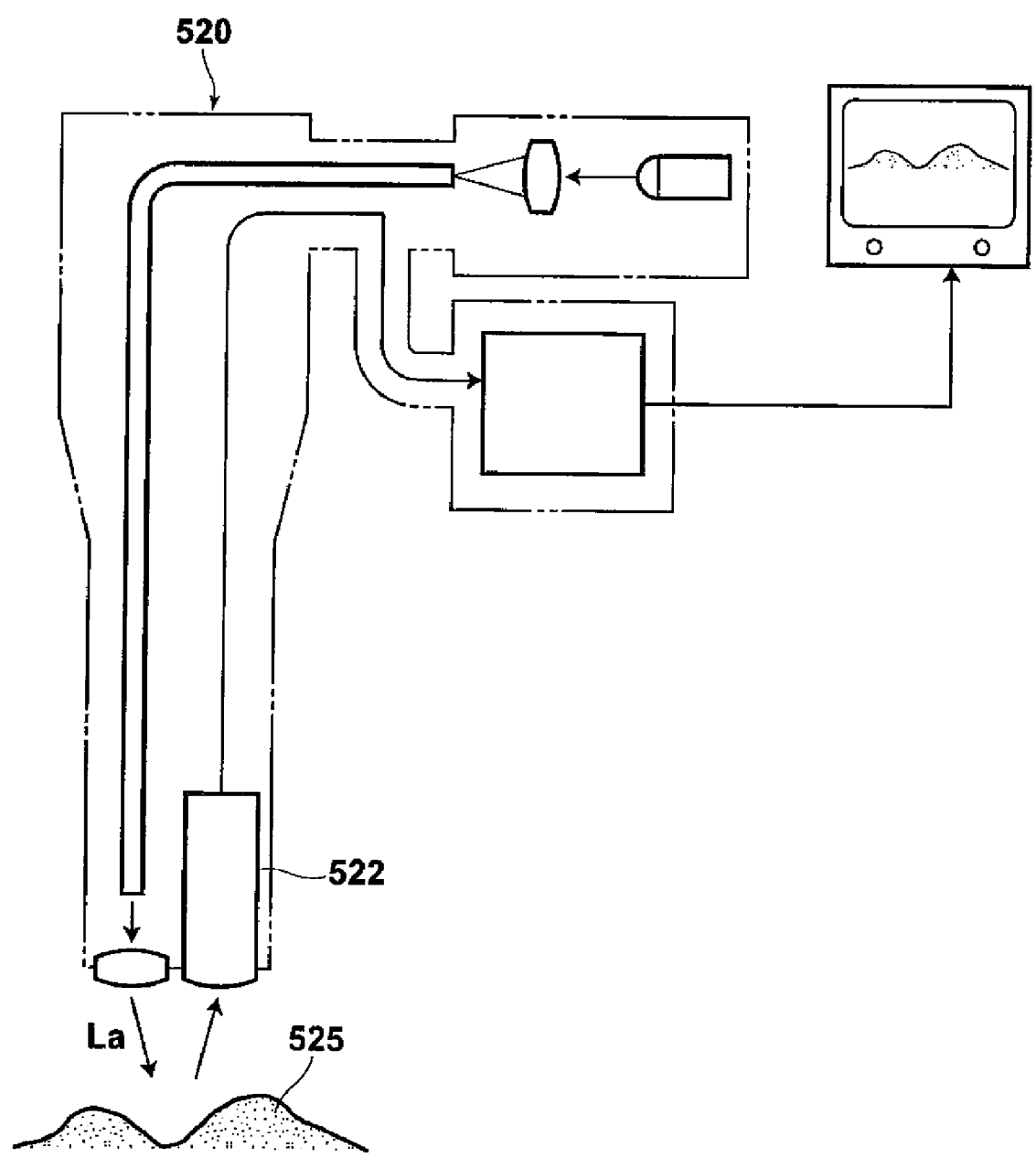
FIG. 24 is a view showing an endoscope apparatus which is a medical apparatus including an imaging system.

FIG. 24 is a view showing an endoscope apparatus which is a medical apparatus including an imaging system.

As shown in the drawing, an endoscope apparatus 520 that observes a biological tissue 525 has an imaging system 522, which is used to image the biological tissue 525 illuminated by illumination light La, provided on a front end 521 of the endoscope apparatus 520.

Thus, in the imaging apparatus, the portable terminal apparatus, the onboard apparatus, and the medical apparatus of the invention including the above-described imaging system, a known imaging system provided in an imaging apparatus, a portable terminal apparatus, an onboard apparatus, and a medical apparatus known from the past may be easily replaced. That is, the imaging apparatus, the portable terminal apparatus, the onboard apparatus, and the medical apparatus of the invention may be constructed by replacing the known imaging systems provided in the known apparatuses with the imaging system of the invention without changing the apparatus size, shape, and the like of the imaging apparatus, portable terminal apparatus, onboard apparatus, and medical apparatus known from the past.

The imaging system may be constructed such that an optical image of a subject is projected onto a light receiving surface only through an optical member having an axisymmetric shape or the optical image of the subject is projected onto the light receiving surface through an optical member having a non-axisymmetric shape. In addition, it is preferable that the imaging lens have a large depth of field. That is, it is preferable to construct the imaging lens and the imaging device such that a change in a blur state of a point image projected onto a light receiving surface is decreased even if a change in a state where an optical image of a subject is projected onto the light receiving surface occurs due to the movement of the subject or focus adjustment of the imaging lens, for example. More specifically, it is preferable to construct the imaging lens and the imaging device such that changes in size and contrast of the effective region of the point image projected onto the light receiving surface are decreased. However, the imaging system may also be made to include an imaging lens having a small depth of field without being limited to a case in which the imaging system includes an imaging lens having a large depth of field.

In addition, the imaging device used in the above-described imaging system may be a CCD device or a CMOS device.

<Lens Configuration and Operation of an Imaging Lens>

Next, configuration and operation of an imaging system in each of first to third examples used in the above imaging system 100 will be described in detail. Imaging lenses 10A to 10C, which will be described later, used in imaging systems of the first to third examples become examples of the above-described imaging lens 10.

In addition, the imaging lens 10 has a first lens group, which includes at least one lens and has a positive power, and a second lens group, which includes at least one lens and in which a lens positioned closest to an image side has a negative power, in order from a subject side.

<Regarding an Imaging System of Example 1>

Figure 11:
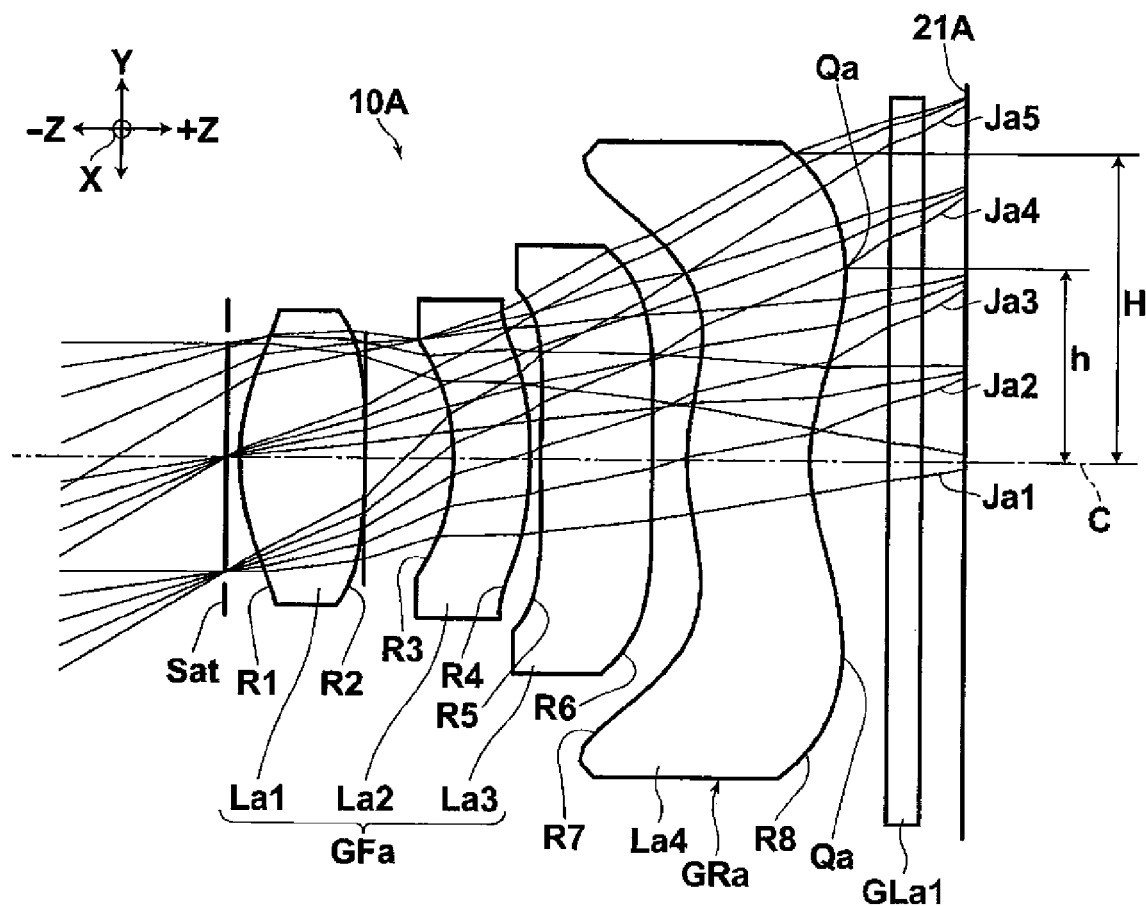
FIG. 11 is a cross-sectional view showing a schematic configuration of an imaging lens disposed in an imaging system in Example 1.

FIG. 11 is a cross-sectional view showing the schematic configuration of an imaging lens 10A including four single lenses in Example 1. FIGS. 12A to 12D are views showing a change in a value (%) of MTF characteristics of an optical image projected onto a light receiving surface when the light receiving surface is defocused with respect to the imaging lens onto the coordinates in which the horizontal axis indicates a defocus amount Ud (μm) in the optical-axis direction (Z-axis direction) of the light receiving surface onto which an image of a subject is projected through the imaging lens 10A and the vertical axis indicates the value (%) of MTF characteristics. Here, a defocus range of the light receiving surface 21A is 400 μm.

Figure 12A:
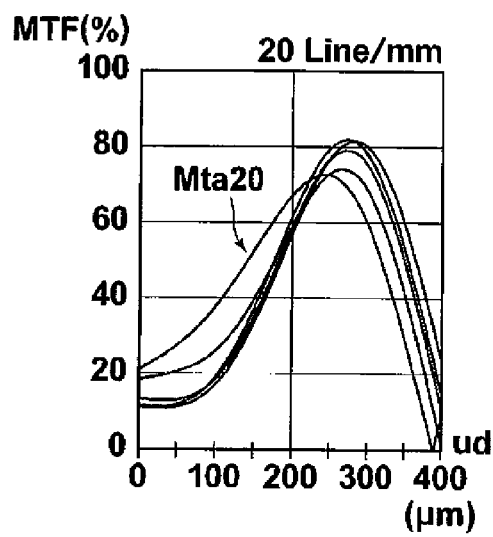
FIGS. 12A to 12D are views illustrating a change in a value of MTF characteristics when a light receiving surface is defocused, specifically.
Figure 12B:
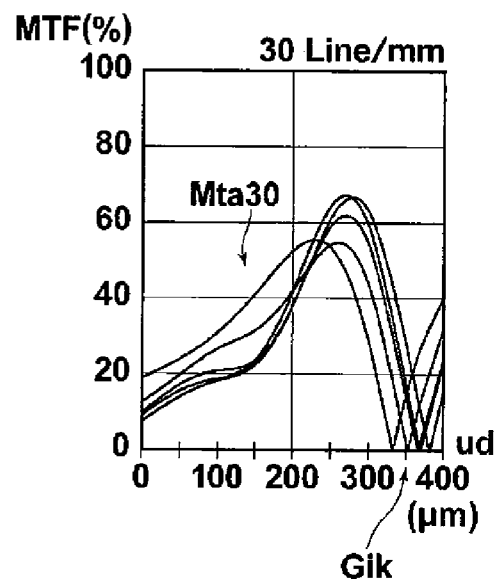
Figure 12C:
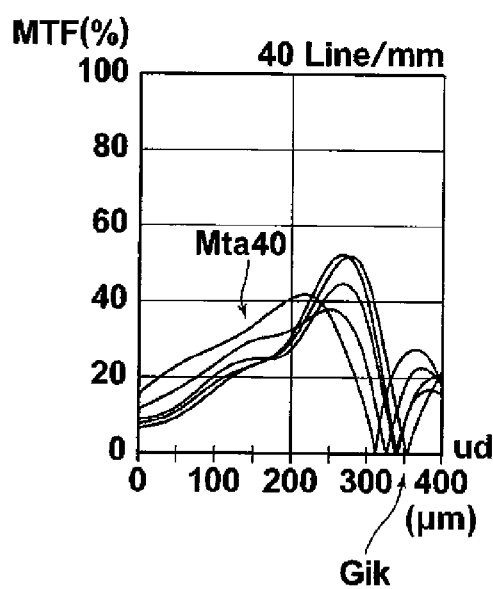
Figure 12D:
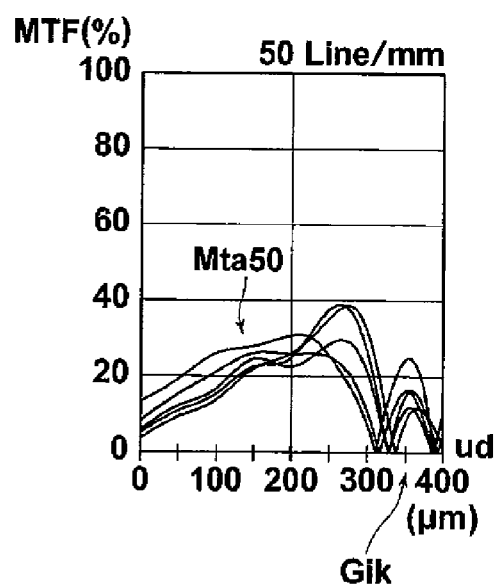

More specifically, FIGS. 12A to 12D are views showing a change in the value (%) of MTF characteristics regarding optical images projected at various image heights when the light receiving surface 21A is defocused in a state where the position of the subject with respect to the imaging lens 10A is fixed. FIG. 12A shows a change in a value of MTF characteristics in a spatial frequency of 20 line/mm, FIG. 12B shows a change in a value of MTF characteristics in a spatial frequency of 30 line 1 mm, FIG. 12C shows a change in a value of MTF characteristics in a spatial frequency of 40 line/mm, and FIG. 12D shows a change in a value of MTF characteristics in a spatial frequency of 50 line/mm.

In addition, for a horizontal axis Ud indicating the defocus amount shown in FIGS. 12A to 12D, a direction (direction in which a value of Ud approaches 400 μm) in which the value increases indicates a direction in which the imaging lens and the light receiving surface become distant from each other and a direction (direction in which the value of Ud approaches 0) in which the value decreases indicates a direction in which the imaging lens and the light receiving surface become close to each other.

As shown in FIG. 11, the imaging lens 10A has an aperture diaphragm Sat, a first single lens La1, a second single lens La2, a third single lens La3, a fourth single lens La4, and an optical member GLa1 which are arrayed in order from the subject side (side of −Z direction indicated by arrow in the drawing) along the optical axis C (Z axis). In addition, lens surfaces R1, R3, R5, and R7 shown in FIG. 11 indicate incidence-side surfaces of the single lenses La1 to La4, and lens surfaces R2, R4, R6, and R8 indicate emission-side surfaces of the single lenses La1 to La4. An optical image of a subject is projected onto the light receiving surface 21A through the imaging lens 10A.

In addition, it is preferable to dispose a cover glass, a low pass filter, or an IR cut filter on the subject side of the light receiving surface 21A according to the configuration of an imaging system. In consideration of this, an example in which the optical member GLa1 that does not have power and has a parallel plate shape is disposed is shown in FIG. 11. In addition, the aperture diaphragm Sat does not indicate the shape or size but indicates the position on the optical axis Z.

Furthermore, in FIG. 11, five light rays Ja1, Ja2, Ja3, Ja4, and Ja5 are shown in order of small image height from the on-axis light ray Ja1 to the off-axis light ray Ja5 incident at a maximum angle of view.

In addition, five MTF curves Mta20 shown in FIG. 12A indicate a change in a value of MTF characteristics in a spatial frequency of 20 Line/mm at each position where the five light rays are projected onto the light receiving surface 21A. Five MTF curves Mta30 shown in FIG. 12B indicate a change in a value of MTF characteristics in a spatial frequency of 30 Line/mm at each position similar to that described above, five MTF curves Mta40 shown in FIG. 12C indicate a change in a value of MTF characteristics in a spatial frequency of 40 Line/mm at each position similar to that described above, and five MTF curves Mta50 shown in FIG. 12D indicate a change in a value of MTF characteristics in a spatial frequency of 50 Line/mm at each position similar to that described above.

In addition, although an example in which the optical member GLa1 is disposed between the fourth single lens La4 and the light receiving surface 21A is shown as the configuration example of FIG. 11, a low pass filter or various kinds of filters which cut a specific wavelength region may be disposed between lenses. Alternatively, surface treatment (coating) having the same operation as various filters may be performed on a lens surface of one of the first single lens La1 to the fourth single lens La4.

The imaging lens 10A has a first lens group GFa, which includes the three single lenses La1, La2, and La3 and has a positive power, and a second lens group GRa, which includes the one single lens La4 and has a negative power, in order from the object side. A lens surface R8 positioned closest to the image side in the second lens group GRa has an off-axis inflection point Qa.

In addition, as described above, an inflection point is a point on a lens surface, and the inflection point in the case where a tangential plane at this point is perpendicular to the optical axis C (Z axis) is called an inflection point. Moreover, an inflection point other than the point crossing the optical axis on the lens surface is called an off-axis inflection point.

In the imaging lens 10A, the lens surface R8 is concave toward the image side in the middle of the lens surface R8 and convex toward the image side in the periphery of the lens surface R8. Moreover, the lens surface R8 satisfies the following conditional expression (1).

$$0.5H < h < H \qquad (1)$$

Here, "H" is an effective radius of the lens surface R8, and "h" is a distance from the off-axis inflection point Qa of the lens surface R8 to the optical axis.

In addition, it can be said that the distance h from the off-axis inflection point Qa of the lens surface R8 to the optical axis is a height from the optical axis of a point on an aspheric surface where the inclination of a tangential plane with respect to a tangential plane (plane perpendicular to the optical axis) of an aspheric apex becomes 0.

In addition, the first single lens La1 positioned closest to the subject side (side of −Z direction indicated by arrow in the drawing) among the three single lenses La1, La2, and La3 that form the first lens group GFa of the imaging lens 10A has a positive power, and the lens surface R1 of the single lens La1 on the subject side is convex toward the subject side. The second single lens La2 adjacent to the first single lens La1 in the first lens group GFa has a negative power, and the lens surface R4 of the second single lens La2 on the image side (side of +Z direction indicated by arrow in the drawing) is convex surface toward the image side. The third single lens La3 positioned closest to the image side in the first lens group GFa has a positive power.

Hereinafter, design data of the imaging lens 10A in the first example will be described.

Lens data and various kinds of data are shown in Table 1, coefficients of aspheric expression of each aspheric surface are shown in Table 2, and approximate specification of the imaging lens 10A is shown in Table 3.

TABLE 1

Example 1 (four lenses)

| Surface number | Ri | Di | Ndj | vdj |
|---|---|---|---|---|
| Aperture diaphragm | ∞ | 0.119 | | |
| 1* | 2.070 | 1.110 | 1.47136 | 76.6 |
| 2* | −15.959 | 0.800 | | |
| 3* | −2.162 | 0.679 | 1.60595 | 27.0 |
| 4* | −9.117 | 0.100 | | |
| 5* | 6.048 | 1.000 | 1.51007 | 56.2 |
| 6* | 29.492 | 0.314 | | |
| 7* | 2.160 | 1.100 | 1.51007 | 56.2 |
| 8* | 1.782 | 0.700 | | |
| 9 | ∞ | 0.300 | 1.51633 | 64.1 |
| 10 | ∞ | 0.376 | | |
| Image surface | ∞ | 0.000 | | |

Focal length 5.277
F number 2.8

TABLE 2

Example 1 (four lenses)

| Surface number | K | A3 | A4 | A5 | A6 |
|---|---|---|---|---|---|
| 1 | 1.21129740 | −0.02464958 | 0.05275897 | −0.12023671 | 0.05100521 |
| 2 | −10.00343250 | −0.00475970 | −0.02553074 | −0.01379899 | −0.01198224 |
| 3 | 1.55127390 | −0.00118810 | −0.13263220 | 0.10838046 | 0.00206148 |
| 4 | −9.27863960 | −0.10122820 | −0.11447178 | 0.12665960 | 0.00449924 |
| 5 | −50.08963290 | −0.13043949 | 0.06749931 | 0.00339300 | −0.01076773 |
| 6 | 10.02612250 | −0.01717648 | −0.00600583 | −0.00521320 | −0.00090616 |
| 7 | −10.06977900 | 0.03412823 | −0.07001306 | −0.00663654 | 0.00200906 |
| 8 | −4.22653160 | 0.03095479 | −0.07589071 | 0.02710552 | −0.00354984 |

| Surface number | A7 | A8 | A9 | A10 |
|---|---|---|---|---|
| 1 | 0.04176113 | −0.01010916 | −0.04612620 | 0.01953189 |
| 2 | 0.00539686 | 0.01124139 | −0.01613398 | 0.00437339 |
| 3 | −0.04216384 | 0.00198517 | 0.04783041 | −0.02009110 |
| 4 | −0.02944682 | −0.00473446 | 0.00920799 | 0.00141127 |
| 5 | −0.00966040 | −0.00019870 | 0.00284438 | −0.00122221 |
| 6 | −0.00162871 | −0.00057243 | 0.00043875 | −0.00004603 |
| 7 | 0.00239877 | −0.00064428 | −0.00007006 | 0.00007089 |
| 8 | −0.00120134 | 0.00045058 | 0.00008157 | −0.00003850 |

As shown below the lens data of Table 1, the focal length f of the imaging lens 10A is 5.277 mm and the F number is 2.8.

In the lens data of Table 1, the surface number indicates an i-th surface number (i=1, 2, 3, . . . ) increasing sequentially toward the image side with a lens surface positioned closest to the subject side as a first lens surface. Moreover, in Table 1, a surface number (i=9, 10) of the optical member GLa1 is also described since the aperture diaphragm Sat and the optical member GLa1 are described together.

"Ri" of Table 1 indicates a paraxial radius of curvature of the i-th surface (i=1, 2, 3, . . . ), and "Di" indicates a surface spacing between the i-th (i=1, 2, 3, . . . ) surface and the (i+1)-th surface on the optical axis Z. "Ri" of Table 1 corresponds to the reference numeral Ri (i=1, 2, 3, . . . ) in FIG. 1.

Ndj of Table 1 indicates a refractive index of a j-th (j=1, 2, 3, . . . ) optical element at the d-line (wavelength of 587.6 nm), the j-th number (j=1, 2, 3, . . . ) increasing sequentially toward the image side with an optical element positioned closest to the subject side as a first optical element. In addition, vdj of Table 1 indicates the Abbe number of the j-th optical element with respect to the d line. In Table 1, the units of paraxial radius of curvature and on-axis surface spacing is mm. In the case of the paraxial radius of curvature, a case in which the

TABLE 3

Example 1
F number 2.8/Focal length 5.277 mm
Four-lens construction

| Maximum diameter Dmax (μm) of an effective region of a point image | Number of pixels Ngs corresponding to the maximum diameter Dmax of an effective region of a point image, which is converted for each pixel pitch of each pixel region | | | Shortest photographing distance Sk (mm) | Focal length Sd (μm) | h:H/2 |
|---|---|---|---|---|---|---|
| | Pixel pitch Pg = 2.2 μm conversion | Pixel pitch Pg = 1.85 μm conversion | Pixel pitch Pg = 1.4 μm conversion | | | |
| 10 | 4.5 | 5.7 | 7.1 | 26f | 250 | 1.73:1.38 |
| 7 | 3.2 | 4.0 | 5.0 | 22f | 300 | | subject side is convex is positive and a case in which the image side is convex is negative. In addition, the meaning of symbols in Table 1 is also equal to that in examples to be described later.

In the lens data of Table 1, an aspheric surface has a surface number added with * mark. Each aspheric surface is defined by the following aspheric expression.

$$Z = \frac{Y^2/R}{1+(1-K \cdot Y^2/R^2)^{1/2}} + \sum_{i=3}^{20} AiY^i$$

Z: Aspheric depth (length of a perpendicular line from a point with the height Y on an aspheric surface to a plane perpendicular to an optical axis with which an aspheric apex is in contact)

Y: height (distance from an optical axis)

R: paraxial radius of curvature

K, Ai: aspheric coefficient (i=3 to 20)

Values of coefficients K, A3, A4, A5, . . . of each aspheric surface in the aspheric expression A are shown in Table 2.

In each of the single lenses La1 to La4 that form the imaging lens 10A, both an incidence-side lens surface and an emission-side lens surface have aspheric shapes.

In addition, Table 3 shows the relationship among a maximum diameter Dmax of an effective region of a point image, the number of pixels (number of pixel regions) Ngs corresponding to the maximum diameter Dmax of the effective region of the point image, a shortest taking distance Sk, and a focal depth Sd in the imaging system of Example 1.

Furthermore, the column of "h: H/2" in Table 3 indicates a distance of "h" from the optical axis to an off-axis inflection point of the lens surface R8. In addition, "H/2" indicates a size (size of 0.5H) of half of the effective radius H of the lens surface R8. Here, it can be seen that the lens surface R8 satisfies the conditional expression (1) of "0.5H<h<H".

In addition, the pixel number Ngs in Table 3 indicates the number of pixel regions corresponding to the maximum diameter of an effective region of a point image for each pixel pitch Pg (2.2 μm, 1.85 μm, 1.4 μm) in a pixel region on a light receiving surface. Here, a value of the pixel number Ngs is calculated by expression of "pixel number Ngs=maximum diameter Dmax/pixel pitch Pg".

The maximum diameter Dmax of the effective region of the point image is a diameter of the effective region of the point image in a direction in which the effective region of the point image includes a largest number of pixels, and the pixel pitch Pg is a pitch between pixel regions (light receiving pixels) in the direction.

The shortest taking distance Sk is a recommended value when an imaging lens is supplied for practical use and indicates a shortest distance from an imaging lens, which can project an image of a subject onto a light receiving surface with desired resolution, to the subject. This shortest distance is expressed as a distance (taking distance) from a lens surface (here, the lens surface R1), which is positioned closest to the imaging lens, to a subject.

This shortest taking distance is included in a range of a taking distance allowing to obtain an effect in which the quality of image data obtained by imaging an optical image projected onto the light receiving surface is improved by restoration processing.

Furthermore, in imaging systems of Examples 1 to 3, the range of the taking distance allowing to obtain an effect of improving the quality of image data obtained by the restoration processing is a range of a taking distance from 0 to ∞ (point at infinity) and is an entire range in which a subject can be photographed.

The focal depth Sd indicates a defocus range in which an image of a subject can be projected onto the light receiving surface with resolution equal to or larger than that defined when the light receiving surface is defocused in a state where the position of the subject with respect to the imaging lens is fixed. This focal depth Sd is a value considered to correspond to the range of the taking distance, in which a subject can be projected onto the light receiving surface with an intended resolution in a state where the position of the light receiving surface with respect to the imaging lens is fixed at an intended position, to some extent. That is, it is thought that a range of a taking distance in which a subject can be projected onto the light receiving surface with the intended resolution is increased as a value of the focal depth Sd is increased.

In addition, the definition of aspheric expression and meaning of lens data, various kinds of data, coefficients of aspheric expression, expression regarding approximate specification of an imaging lens, numeric values, and terms in Tables 1, 2, and 3 is equal to that in the examples to be described later.

As can be seen from Table 3, the imaging system of Example 1 is constructed such that a maximum diameter of an effective region of a point image covers three or more pixel (3.2 pixels) when the effective region of the point image projected onto the light receiving surface 21A is 7 μm or more and the pixel pitch between light receiving pixels that form the light receiving surface 21A is 2.2 μm or less.

In addition, a value of the shortest taking distance Sk is 26f (about 137 mm) when the maximum diameter Dmax of the effective region of the point image is set to 10 μm and is 22f (about 116 mm) when the maximum diameter Dmax of the effective region of and the point image is set to 7 μm.

In addition, a value of the focal depth Sd of the imaging lens 10A is 250 μm when the maximum diameter Dmax of the effective region of the point image is set to 10 μm and is 300 μm when the maximum diameter Dmax of the effective region of and the point image is set to 7 μm.

For a value of MTF characteristics regarding the imaging system of Example 1, when the light receiving surface 21A is made to be closest to the imaging lens 10A, that is, when a value of defocus amount Ud in FIGS. 12A to 12D is 0, all values of MTF characteristics in a spatial frequency of 20 to 50 Line/mm are positive values.

In addition, when the light receiving surface 21A is away from the imaging lens 10A, that is, when the value of defocus amount in FIGS. 12A to 12D is set to 300 μm, all values of MTF characteristics in a spatial frequency of 20 to 50 Line/mm are positive values.

That is, when the value of defocus amount is in a range of 0 to 300 μm, all values of MTF characteristics in a spatial frequency of 20 to 50 Line/mm are positive values.

In a range in which the value of defocus amount is 300 μm to 400 μm, the value of MTF characteristics in a spatial frequency of 30 to 50 Line/mm is inverted from 0% and false resolution occurs. The range in which the false resolution occurs is indicated by arrow Gik in the drawing.

Here, since it can be said that image data obtained by imaging an image of a subject projected onto a light receiving surface has optically meaningful information when the value of MTF characteristics regarding the image is larger than 0%, the image data may be subjected to restoration processing in order to improve the resolution. However, in the case where the value of MTF characteristics regarding the image of the subject projected onto the light receiving surface is 0% or is turned up from 0% to cause the false resolution to occur, image data obtained by imaging the image does not have optically meaningful information. Accordingly, even if the restoration processing is performed on such image data, it is not possible to improve the quality (resolution of an image expressed by the image data) of the image data.

Thus, according to the imaging system, the value of MTF characteristics of an image obtained by projecting a subject onto the light receiving surface 21A can always be set to a value larger than 0% (it is possible to prevent the false resolution from occurring) when a taking distance is made to change in a range of 22f to ∞ in an intended state where the positional relationship between the light receiving surface 21A and the imaging lens 10A is fixed.

That is, an image of a subject projected onto the light receiving surface 21A in a range of a taking distance of 0 to ∞ can be made as a meaningful image.

Moreover, since an effective region of a point image projected onto the light receiving surface 21A when the taking distance is made to change in the range of 0 to ∞ has a size covering three or more pixels on the light receiving surface 21A, the resolution of an image can be improved by executing the restoration processing on image data obtained by imaging a subject existing in this range.

That is, it can be said that image data obtained by imaging an image including various subjects, which are projected onto the light receiving surface 21A through the imaging system in Example 1 and exist in a range of a taking distance of 22f to ∞, satisfies a prerequisite (condition for improving the resolution) for executing the restoration processing.

In addition, the restoration processing can be more easily executed by suppressing a fluctuation in the size of a point image projected onto the light receiving surface 21A small. That is, even if an image projected onto the light receiving surface includes various subjects existing at different taking distances, for example, the restoration processing can be executed without changing a parameter in image data expressing a subject existing at any position if blur states of point images forming images of the subjects are equal. Thus, a burden of the signal processing unit that executes the restoration processing can be reduced.

On the other hand, in the case of executing the restoration processing using the same parameter all the time, the resolution of an image expressing a corresponding subject can be similarly improved for image data expressing a subject existing at any position by executing the restoration processing if blur states of point images that form images of various subjects, which are projected onto the light receiving surface and exist at different taking distances, are equal. That is, by execution of the restoration processing, the resolution of an image can be improved uniformly over the entire image.

Thus, by designing the imaging lens 10A such that the focal depth of the imaging lens 10A is large, the resolution of the entire image expressed by image data obtained by imaging an image including various subjects, which are projected onto the light receiving surface 21A through the imaging lens 10A and exist in a range of a taking distance of 22f to ∞, can be improved by the restoration processing.

In addition, according to the imaging lens 10A designed as described above, an incidence angle of light incident on the light receiving surface 21A with respect to the light receiving surface 21A can be made small, that is, an imaging lens with good telecentricity can be obtained.

Hereinafter, imaging systems of Examples 2 and 3 will be described. In addition, since optical properties of the imaging systems in Examples 2 and 3 are similar to those of the imaging system in Example 1, an explanation thereof will be omitted.

<Regarding an Imaging System of Example 2>

Figure 13:
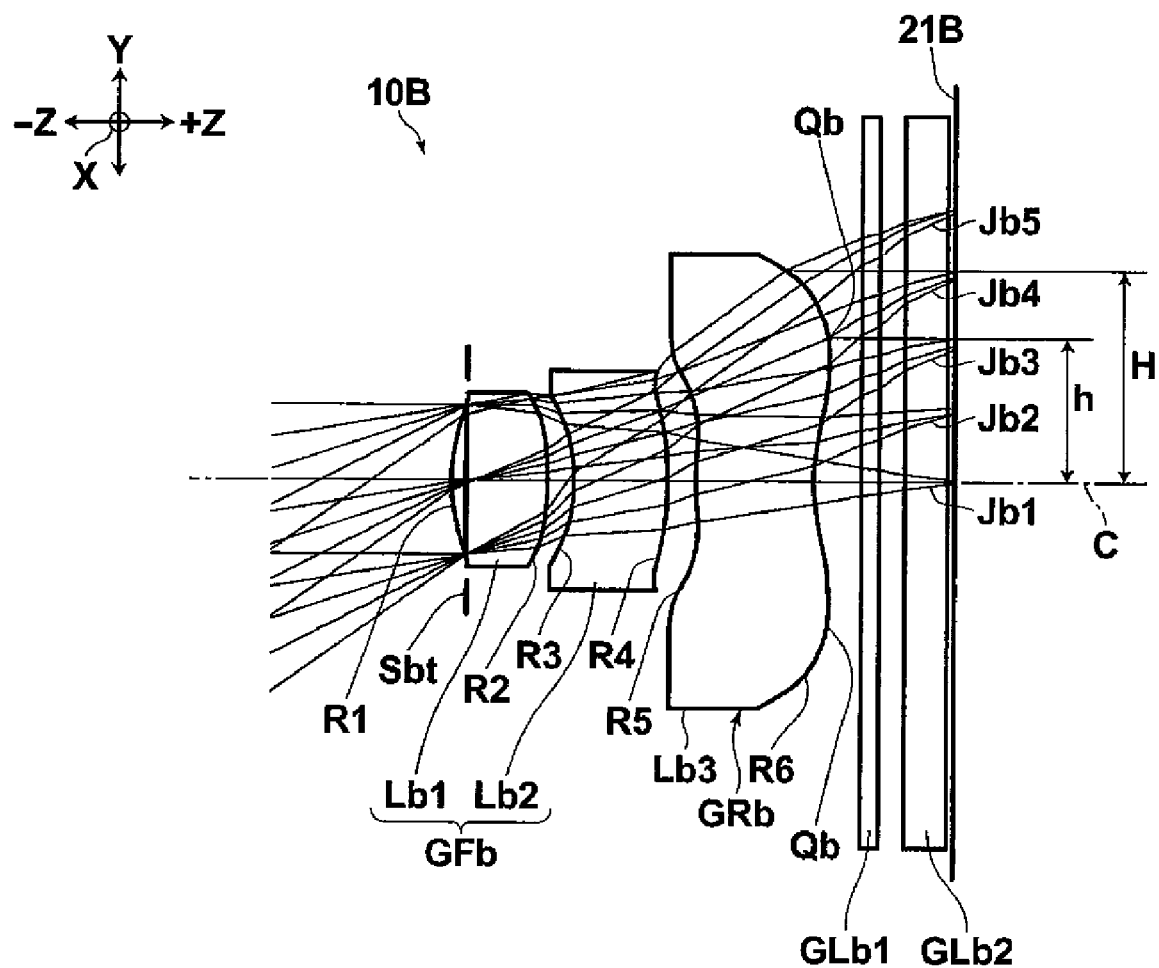
FIG. 13 is a cross-sectional view showing the schematic configuration of an imaging lens disposed in an imaging system in Example 2.

FIG. 13 is a cross-sectional view showing the schematic configuration of an imaging lens 10B including three single lenses in the second example. FIGS. 14A to 14D are views showing a change in a value (%) of MTF characteristics of an optical image projected onto a light receiving surface when the light receiving surface is defocused with respect to the imaging lens onto the coordinates in which the horizontal axis indicates a defocus amount Ud (μm) in the optical-axis direction (Z-axis direction) of the light receiving surface and the vertical axis indicates the value (%) of MTF characteristics. Here, a defocus range of the light receiving surface is 400 μm.

In addition, FIGS. 14A to 14D showing the MTF characteristics of the imaging system regarding the imaging lens 10B correspond to FIGS. 12A to 12D showing the MTF characteristics regarding the imaging lens 10A.

As shown in FIG. 13, the imaging lens 10B has an aperture diaphragm Sbt, a first single lens Lb1, a second single lens Lb2, a third single lens Lb3, a first optical member GLb1, and a second optical member GLb2 which are arrayed in order from the subject side (side of −Z direction indicated by arrow in the drawing) along the optical axis C (Z axis). In addition, lens surfaces R1, R3, and R5 shown in FIG. 13 indicate incidence-side surfaces of the single lenses Lb1 to Lb3, and lens surfaces R2, R4, and R6 indicate emission-side surfaces of the single lenses Lb1 to La3. An optical image of a subject is projected onto a light receiving surface 21B through the imaging lens 10B.

In addition, each of the first and second optical members GLb1 and GLb2 is an optical member which is formed of a parallel plate and does not have power.

The first and second optical members GLb1 and GLb2 which do not have power are disposed between the third single lens Lb3 and the light receiving surface 21B.

Furthermore, in FIG. 13, five light rays Jb1, Jb2, Jb3, Jb4, and Jb5 are shown in order of small image height from the on-axis light ray Jb1 to the off-axis light ray Jb5 incident at a maximum angle of view.

Figure 14A:
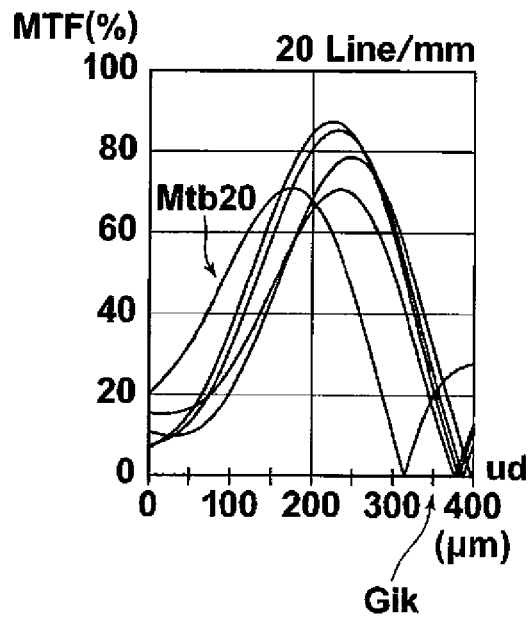
FIGS. 14A to 14D are views illustrating a change in a value of MTF characteristics when a light receiving surface is defocused, specifically.
Figure 14B:
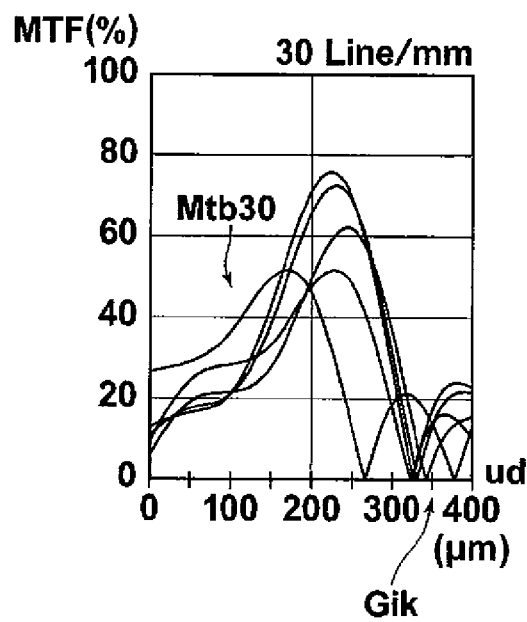
Figure 14C:
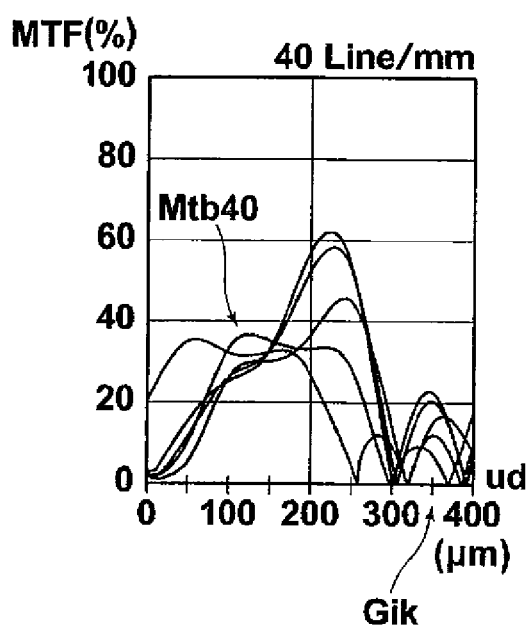
Figure 14D:
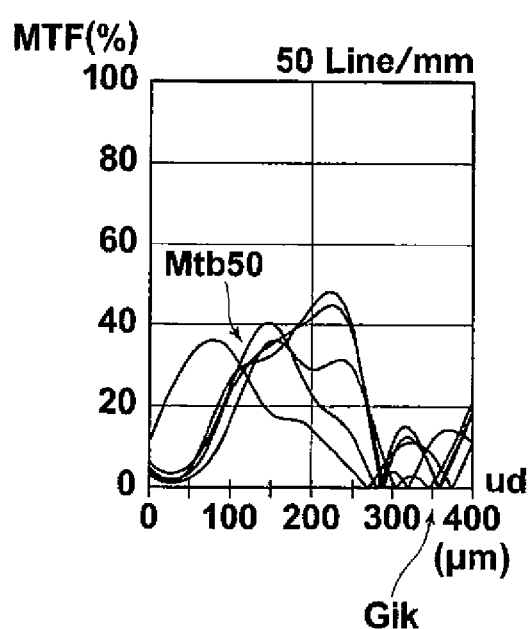

In addition, five MTF curves Mtb20 shown in FIG. 14A indicate a change in a value of MTF characteristics in a spatial frequency of 20 Line/mm at each position where the five light rays are projected onto the light receiving surface 21B. Five MTF curves Mtb30 shown in FIG. 14B indicate a change in a value of MTF characteristics in a spatial frequency of 30 Line/mm at each position similar to that described above, five MTF curves Mtb40 shown in FIG. 14C indicate a change in a value of MTF characteristics in a spatial frequency of 40 Line/mm at each position similar to that described above, and five MTF curves Mtb50 shown in FIG. 14D indicate a change in a value of MTF characteristics in a spatial frequency of 50 Line/mm at each position similar to that described above.

The imaging lens 110B has a first lens group GFb, which includes the two single lenses Lb1 and La2 and has a positive power, and a second lens group GRb, which includes the one single lens Lb3 and has a negative power, in order from the subject side. A lens surface R6 positioned closest to the image side (side of +Z direction indicated by arrow in the drawing) in the second lens group GRb has an off-axis inflection point Qb.

In the imaging lens 10B, the lens surface R6 positioned closest to the image side in the second lens group GRb is concave toward the image side in the middle of the lens surface R6 and convex toward the image side in the periphery of the lens surface R6. Moreover, the lens surface R6 satisfies the above conditional expression (1) 0.5H<h<H.

In addition, the first single lens Lb1 positioned on the subject side (side of −Z direction indicated by arrow in the drawing) of the two single lenses Lb1 and La2 that form the first lens group GFb has a positive power, and the lens surface R1 of the single lens Lb1 on the subject side is convex surface toward the subject side. In the second single lens Lb2 of the first lens group GFb positioned on the image side, the image-side surface R4 of the single lens Lb2 is convex toward the image side.

Hereinafter, design data of the imaging lens 10B in the second example will be described.

Lens data and various kinds of data are shown in Table 4, coefficients of aspheric expression of each aspheric surface are shown in Table 5, and approximate specification of the imaging lens 10B is shown in Table 6. In addition, "Ri" of Table 4 and the reference numeral "Ri" in FIG. 13 correspond to each other.

TABLE 4

Example 2 (three lenses)

| Surface number | Ri | Di | Ndj | vdj |
|---|---|---|---|---|
| Aperture diaphragm | ∞ | −0.120 | | |
| 1* | 1.445 | 0.791 | 1.53114 | 55.4 |
| 2* | −3.395 | 0.223 | | |
| 3* | −1.560 | 0.764 | 1.63178 | 23.2 |
| 4* | −11.065 | 0.234 | | |
| 5* | 1.703 | 0.960 | 1.53114 | 55.4 |
| 6* | 1.334 | 0.396 | | |
| 7 | ∞ | 0.495 | 1.52000 | 55.0 |
| 8 | ∞ | 0.244 | | |
| Image surface | ∞ | 0.000 | | |

Focal length 3.312
F number 2.7

TABLE 5

Example 2 (three lenses)

| Surface number | K | A3 | A4 | A5 | A6 |
|---|---|---|---|---|---|
| 3 | 0.12852990 | 0.00976249 | −0.03207688 | −0.16317950 | 0.33466830 |
| 4 | 0.09999990 | −0.03023295 | −0.20760347 | −0.06072193 | −0.21300370 |
| 5 | 0.10063060 | 0.07041734 | −0.65685088 | 0.00282485 | 1.80528090 |
| 6 | 0.09999950 | −0.05637836 | −0.77217239 | 0.03211432 | 2.38962630 |
| 7 | 0.03061670 | −0.14017100 | −0.88195617 | 0.01064477 | 0.95719211 |
| 8 | 0.04380360 | −0.03479559 | −0.36508266 | −0.01863131 | 0.26961061 |

| Surface number | A7 | A8 | A9 | A10 | A11 |
|---|---|---|---|---|---|
| 3 | 0.07278352 | −1.00740680 | −0.47470325 | 3.41529050 | −3.16337050 |
| 4 | 0.05253407 | 0.02422838 | −0.03140656 | 0.09130447 | −0.23804840 |
| 5 | 0.28010794 | −7.67023220 | 0.16190599 | 19.86376700 | −0.50337009 |
| 6 | 0.00339539 | −5.71596040 | 0.08306921 | 10.35335700 | 0.03386329 |
| 7 | 0.01726570 | −0.80297213 | −0.00067235 | 0.40314453 | 0.00388345 |
| 8 | 0.03974424 | 0.14562228 | −4.22996350 | 24.18613900 | −82.26362800 |

| Surface number | A12 | A13 | A14 | A15 | A16 |
|---|---|---|---|---|---|
| 3 | −14.25336100 | 5.61940790 | 64.11670800 | 3.13869750 | −154.71176000 |
| 4 | 0.36479431 | 0.92530303 | 0.16338034 | 1.31874660 | −1.09966870 |
| 5 | −26.23953800 | −0.07354199 | 14.72031400 | 2.25487560 | 0.40902761 |
| 6 | −11.67464600 | −0.05449995 | 6.27414510 | −0.11930784 | 2.16706530 |
| 7 | −0.02324472 | 0.00733302 | −0.02721805 | 0.00632184 | −0.00035338 |
| 8 | 187.43373000 | −300.18131000 | 345.61445000 | −287.81496000 | 171.95004000 |

| Surface number | A17 | A18 | A19 | A20 |
|---|---|---|---|---|
| 3 | −1.58385650 | 210.54242000 | −49.25468100 | −105.14658000 |
| 4 | 0.07820894 | 2.68233770 | −16.16748300 | 8.80290720 |
| 5 | 2.07996040 | −5.56428710 | −8.63704520 | 4.82174560 |
| 6 | −0.09071725 | −4.49242640 | 0.05916245 | 1.59162020 |
| 7 | 0.00058318 | −0.00054253 | −0.00431963 | −0.00138795 |
| 8 | −71.87173800 | 19.95655700 | −3.30686960 | 0.24744736 |

TABLE 6

Example 2
F number 2.7/Focal length 3.312 mm
Three-lens construction

| Maximum diameter Dmax (μm) of an effective region of a point image | Number of pixels Ngs corresponding to the maximum diameter Dmax of an effective region of a point image, which is converted for each pixel pitch of each pixel region | | | Shortest photographing distance Sk (mm) | Focal length Sd (μm) | h:H/2 |
|---|---|---|---|---|---|---|
| | Pixel pitch Pg = 2.2 μm conversion | Pixel pitch Pg = 1.85 μm conversion | Pixel pitch Pg = 1.4 μm conversion | | | |
| 7 | 3.2 | 4.0 | 5.0 | 16f | 250 | 0.96:0.865 |

In each of the lenses that form the imaging lens 10B, both an incidence-side lens surface and an emission-side lens surface have aspheric shapes.

In addition, as shown below the lens data of Table 4, the focal length f of the imaging lens 10B is 3.312 mm and the F number is 2.7.

In addition, since meaning of lens data, various kinds of data, coefficients of aspheric expression, expression regarding approximate specification of an imaging lens, numeric values, and terms in Tables 4, 5, and 6 is equal to that in Tables 1, 2, and 3 in Example 1, an explanation thereof will be omitted.

As can be seen from Table 6, the imaging system of Example 2 is constructed such that a maximum diameter of an effective region of a point image covers three or more pixel (3.2 pixels) when the effective region of the point image projected onto the light receiving surface 21B is 7 μm or more and the pixel pitch between light receiving pixels that form the light receiving surface 21B is 2.2 μm or less.

In addition, a value of the shortest taking distance Sk is 16f (about 53 mm) when the maximum diameter Dmax of the effective region of the point image is set to 7 μm.

This shortest taking distance is included in a range of a taking distance allowing to obtain an effect in which the quality of image data obtained by imaging an optical image projected onto the light receiving surface is improved by restoration processing.

A value of the focal depth Sd of the imaging lens 10B is 250 μm when the maximum diameter Dmax of the effective region of the point image is set to 7 μm.

For a value of MTF characteristics regarding the imaging system of the second example, when the light receiving surface 21B is made to be closest to the imaging lens 10B, that is, when a value of defocus amount Ud in FIGS. 14A to 14D is 0 μm, all values of MTF characteristics in a spatial frequency of 20 to 50 Line 1 mm are positive values.

In addition, when the light receiving surface 21B is away from the imaging lens 10B, that is, when the value of defocus amount in FIGS. 14A to 14D is set to 250 μm, all values of MTF characteristics in a spatial frequency of 20 to 50 Line/mm are 5% or more. In a range in which the value of defocus amount is 250 μm to 400 arm, all values of MTF characteristics in a spatial frequency of 20 to 50 Line/mm are inverted from 0% and false resolution occurs. The range in which the false resolution occurs is indicated by arrow Gik in the drawing.

That is, when the value of defocus amount Ud is in a range of 0 μm to 250 μm (in the range of a focal depth), all values of MTF characteristics in a spatial frequency of 20 to 50 Line/mm are positive values.

As described above, according to the imaging system in Example 2, the value of MTF characteristics in a comparatively wide defocus range (about 250 μm) becomes a positive value.

Thus, according to the imaging system in Example 2, the value of MTF characteristics of an image obtained by projecting a subject onto the light receiving surface 21B can always be set to a value larger than 0% (it is possible to prevent the false resolution from occurring) when a taking distance is made to change in a range of 0 to ∞ in an intended state where the positional relationship between the light receiving surface 21B and the imaging lens 10B is fixed.

That is, an image of a subject projected onto the light receiving surface 21B in a range of a taking distance of 16f to ∞ can be made as a meaningful image.

Moreover, since an effective region of a point image projected onto the light receiving surface 21B when the taking distance is made to change in the range of 16f to ∞ has a size covering three or more pixels on the light receiving surface 21B, the resolution of an image can be improved by executing the restoration processing on image data obtained by imaging a subject existing in this range. That is, it can be said that image data expressing subjects, which are obtained through the imaging system in Example 2 and exist in a range of a taking distance of 0 to ∞, satisfies a prerequisite (condition for improving the resolution) for executing the restoration processing.

Thus, by designing the imaging lens 10B such that the focal depth of the imaging lens 10B is large, the resolution of the entire image expressed by image data obtained by simultaneously imaging images of various subjects, which exist in a range of a taking distance of 16f to ∞, by the restoration processing.

In addition, when the imaging system of Example 2 is supplied for practical use, the taking distance is preferably limited to ten times (about 33 mm (10f)) or more of a focal length. More preferably, the taking distance is limited to 53 mm (16f as described above.

Thus, if the taking distance is limited to the range of 33 mm to ∞, a large effect of increasing the resolution of an image by executing the restoration processing on image data obtained by imaging an image of a subject can be acquired. Thus, if the taking distance is limited to the range of 53 mm to ∞, a larger effect of increasing the resolution of an image by executing the restoration processing on image data obtained by imaging an image of a subject can be acquired.

In addition, according to the imaging lens 10B of Example 2 designed as described above, an incidence angle of light incident on the light receiving surface 21B with respect to the light receiving surface 21B can be made small, that is, an imaging lens with good telecentricity can be obtained like the case in Example 1.

<Regarding an Imaging System of Example 3>

Figure 15:
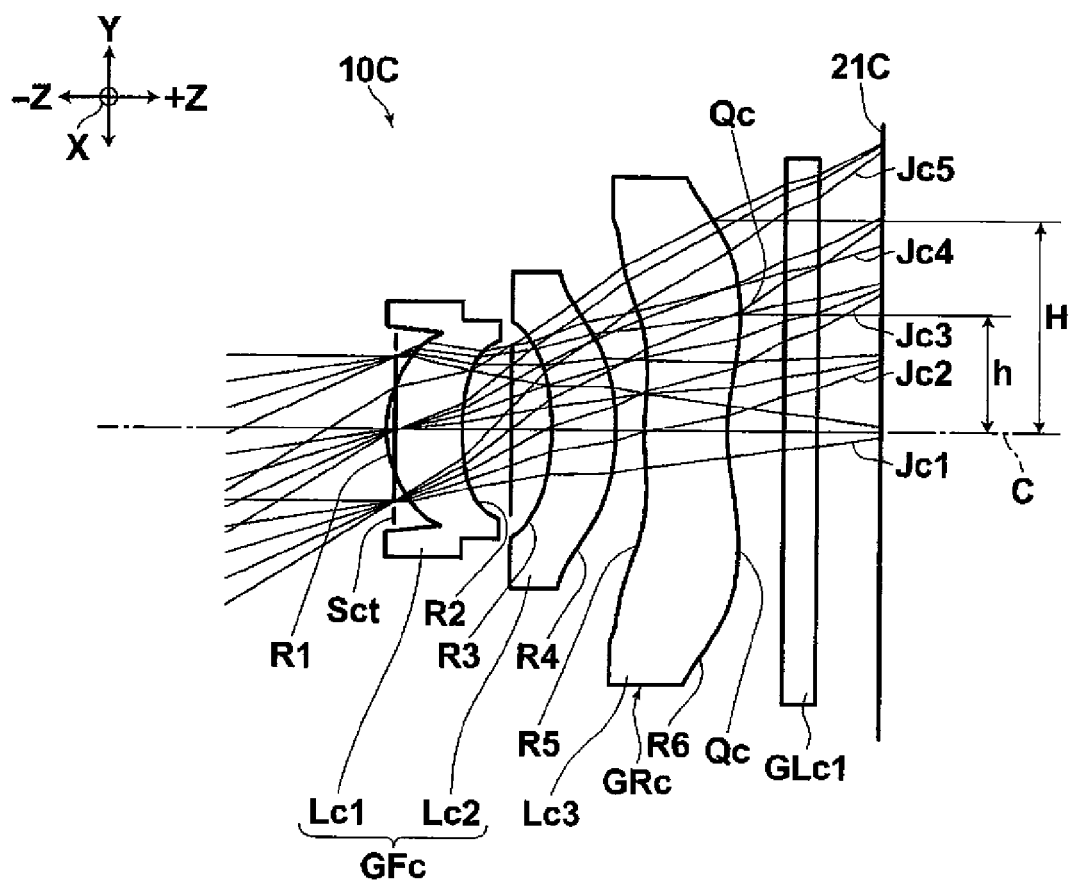
FIG. 15 is a cross-sectional view showing the schematic configuration of an imaging lens disposed in an imaging system in Example 3.

FIG. 15 is a cross-sectional view showing the schematic configuration of an imaging lens 10C including three single lenses in Example 3. FIGS. 16A to 16D are views showing a change in a value (%) of MTF characteristics of an optical image projected onto a light receiving surface when the light receiving surface is defocused with respect to the imaging lens onto the coordinates in which the horizontal axis indicates a defocusing amount Ud (µm) in the optical-axis direction (Z-axis direction) of the light receiving surface and the vertical axis indicates the value (%) of MTF characteristics. Here, a defocus range of the light receiving surface is 400 µm.

In addition, FIGS. 16A to 16D showing the MTF characteristics regarding the imaging lens 10C correspond to FIGS. 12A to 12D showing the MTF characteristics regarding the imaging lens 10A.

As shown in FIG. 15, the imaging lens 10C has an aperture diaphragm Set, a first single lens Lc1, a second single lens Lc2, a third single lens Lc3, and an optical member GLc1 which are arrayed in order from the subject side (side of −Z direction indicated by arrow in the drawing) along the optical axis C (Z axis).

In addition, lens surfaces R1, R3, and R5 shown in FIG. 15 indicate incidence-side surfaces of the single lenses Lc1 to Lc3, and lens surfaces R2, R4, and R6 indicate emission-side surfaces of the single lenses Lc1 to Lc3. An optical image of a subject is projected onto the light receiving surface 21C through the imaging lens 10C.

The optical member GLc1 is an optical member which is formed of a parallel plate and does not have power.

Furthermore, in FIG. 15, five light rays Jc1, Jc2, Jc3, Jc4, and Jc5 are shown in order of small image height from the on-axis light ray Jc1 to the off-axis light ray Jc5 incident at a maximum angle of view.

Figure 16A:
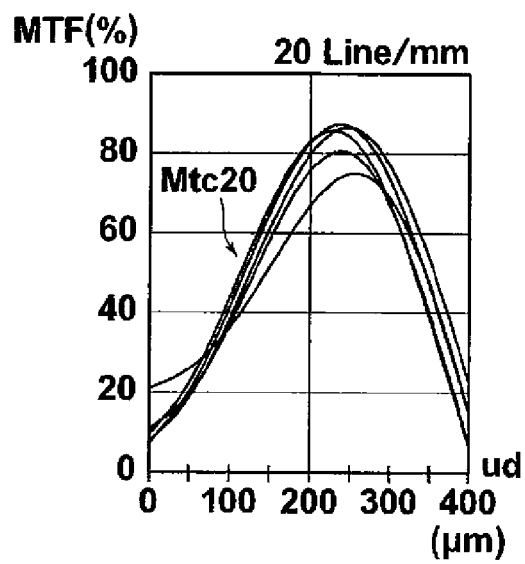
FIGS. 16A to 16D are views illustrating a change in a value of MTF characteristics when a light receiving surface is defocused, specifically.
Figure 16B:
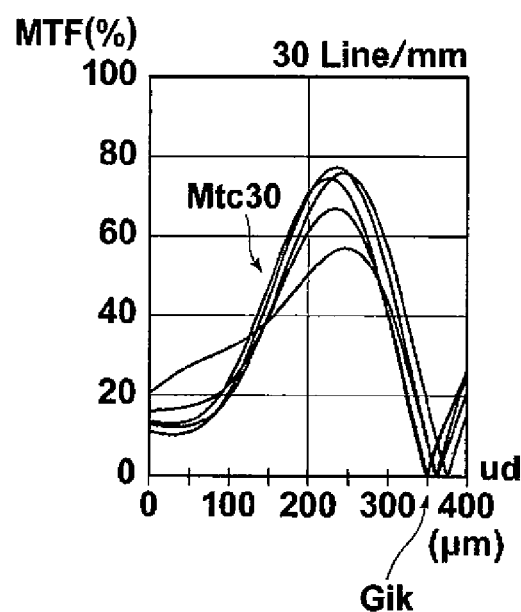
Figure 16C:
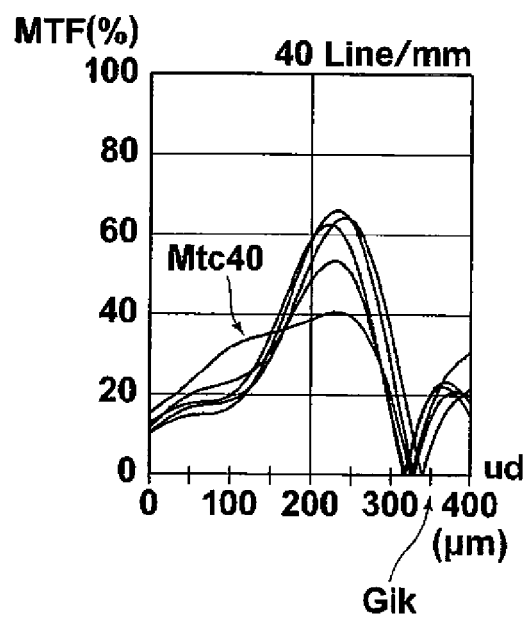
Figure 16D:
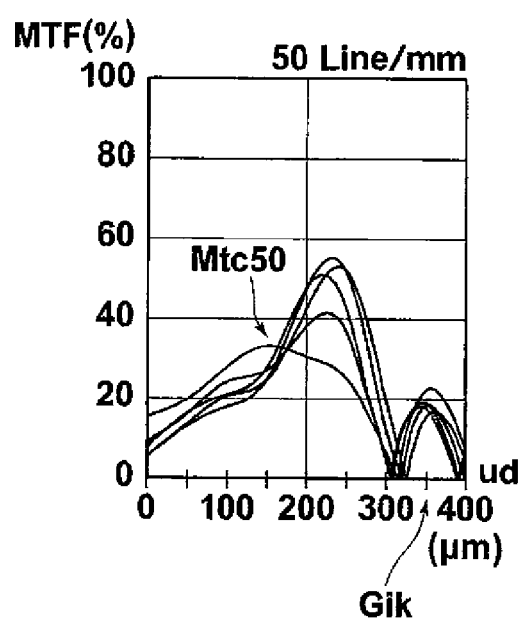

In addition, five MTF curves Mtc20 shown in FIG. 16A indicate a change in a value of MTF characteristics in a spatial frequency of 20 Line/mm at each position where the five light rays are projected onto the light receiving surface 21C. Five MTF curves Mtc30 shown in FIG. 16B indicate a change in a value of MTF characteristics in a spatial frequency of 30 Line 1 mm at each position similar to that described above, five MTF curves Mtc40 shown in FIG. 16C indicate a change in a value of MTF characteristics in a spatial frequency of 40 Line/mm at each position similar to that described above, and five MTF curves Mtc50 shown in FIG. 16D indicate a change in a value of MTF characteristics in a spatial frequency of 50 Line/mm at each position similar to that described above.

The imaging lens 10C has a first lens group GFc, which includes the two single lenses Lc1 and Lc2 and has a positive power, and a second lens group GRc, which includes the one single lens Lc3 and has a negative power, in order from the subject side. A lens surface R6 positioned closest to the image side in the second lens group GRc has an off-axis inflection point Qc.

In the imaging lens 10C, the lens surface R6 positioned closest to the image side in the second lens group GRc is concave toward the image side in the middle of the lens surface R6 and convex toward the image side of the lens surface R6 in the periphery. Moreover, the lens surface R6 satisfies the above conditional expression (1) 0.5H<h<H.

In addition, the first single lens Lc1 positioned on the subject side of the two single lenses Lc1 and Lc2 that form the first lens group GFc has a positive power, and the lens surface R1 of the single lens Lc1 on the subject side is convex toward the subject side. In the second single lens Lc2 of the first lens group GFc positioned on the image side, the image-side surface R4 of the single lens Lc2 is convex toward the image side.

Hereinafter, design data of the imaging lens 10C Example 3 will be described.

Lens data and various kinds of data are shown in Table 7, coefficients of aspheric expression of each aspheric surface are shown in Table 8, and approximate specification of the imaging lens 10C is shown in Table 9. In addition, "Ri" of Table 7 and the reference numeral "Ri" in FIG. 15 correspond to each other.

TABLE 7

Example 3 (three lenses)

| Surface number | Ri | Di | Ndj | vdj |
|---|---|---|---|---|
| Aperture diaphragm | ∞ | −0.120 | | |
| 1* | 1.445 | 0.791 | 1.53114 | 55.4 |
| 2* | −3.395 | 0.223 | | |
| 3* | −1.560 | 0.764 | 1.63178 | 23.2 |
| 4* | −11.065 | 0.234 | | |
| 5* | 1.703 | 0.960 | 1.53114 | 55.4 |
| 6* | 1.334 | 0.396 | | |
| 7 | ∞ | 0.495 | 1.52000 | 55.0 |
| 8 | ∞ | 0.244 | | |
| Image surface | ∞ | 0.000 | | |

Focal length 4.043
F number 3.5

TABLE 8

Example 3 (three lenses)

| Surface number | K | A3 | A4 | A5 | A6 |
|---|---|---|---|---|---|
| 1 | 1.46821160 | −0.02006750 | −0.01716269 | −0.07488272 | −0.00807329 |
| 2 | 5.91246140 | 0.03858523 | −0.00390848 | 0.00521844 | 0.42149785 |
| 3 | 2.68478870 | −0.01203839 | −0.03769086 | −0.00672518 | −0.10003112 |
| 4 | −22.94585750 | −0.26256773 | 0.06660669 | −0.05308108 | 0.03934465 |
| 5 | −4.05769940 | −0.31290897 | −0.02907510 | 0.05714552 | 0.02834143 |
| 6 | −3.33611150 | −0.11799765 | −0.09043585 | 0.08521950 | −0.00370655 |

| Surface number | A7 | A8 | A9 | A10 |
|---|---|---|---|---|
| 1 | 0.20927058 | −0.00396025 | −0.39769240 | 0.03759849 |
| 2 | 0.16034238 | −0.77511754 | −1.93911820 | 3.57739830 |
| 3 | −0.04142547 | 0.12137291 | 0.16117261 | −0.24036373 |

TABLE 8-continued

Example 3 (three lenses)

| 4 | −0.01863391 | 0.01654903 | 0.02453973 | −0.01496812 |
| 5 | −0.01023398 | −0.00261078 | 0.00553029 | −0.00251202 |
| 6 | −0.01246110 | −0.00340986 | 0.00410789 | −0.00065698 |

TABLE 9

Example 3
F number 3.5/Focal length 4.043
Three-lens construction

| Maximum diameter Dmax (μm) of an effective region of a point image | Number of pixels Ngs corresponding to the maximum diameter Dmax of an effective region of a point image, which is converted for each pixel pitch of each pixel region | | | Shortest photographing distance Sk (mm) | Focal length Sd (μm) | h:H/2 |
|---|---|---|---|---|---|---|
| | Pixel pitch Pg = 2.2 μm conversion | Pixel pitch Pg = 1.85 μm conversion | Pixel pitch Pg = 1.4 μm conversion | | | |
| 10 | 4.5 | 5.7 | 7.1 | 15f | 350 | 1.04:0.94 |

In each of the lenses that form the imaging lens 10C, both an incidence-side lens surface and an emission-side lens surface have aspheric shapes.

In addition, as shown below the lens data of Table 7, the focal length f of the imaging lens 10C is 4.043 mm and the F number is 3.5.

In addition, since meaning of lens data, various kinds of data, coefficients of aspheric expression, expression regarding approximate specification of an imaging lens, numeric values, and terms in Tables 7, 8, and 9 is equal to that in Tables 1, 2, and 3 in the Example 1, an explanation thereof will be omitted.

As can be seen from Table 9, the imaging system of Example 3 is constructed such that a maximum diameter of an effective region of a point image covers tree or more pixel (4.5 pixels) when the effective region of the point image projected onto the light receiving surface 21C is 10 μm or more and the pixel pitch between light receiving pixels that form the light receiving surface 21C is 2.2 μm or less.

In addition, a value of the shortest taking distance Sk is 15f (about 60 mm) when the maximum diameter Dmax of the effective region of the point image is set to 10 μm.

This shortest taking distance is included in a range of a taking distance allowing to obtain an effect in which the quality of image data obtained by imaging an optical image projected onto the light receiving surface is improved by restoration processing.

A value of the focal depth Sd of the imaging lens 10C is 350 μm when the maximum diameter Dmax of the effective region of the point image is set to 10 μm.

Moreover, for a value of MTF characteristics regarding the imaging system of Example 3, when the light receiving surface 21C is made to be closest to the imaging lens 10C, that is, when a value of defocus amount Ud in FIGS. 16A to 16D is 0 μm, all values of MTF characteristics in a spatial frequency of 20 to 50 Line/mm are positive values.

In addition, when the light receiving surface 21C is away from the imaging lens 10C, that is, when the value of defocus amount in FIGS. 16A to 16D is set to 300 μm, all values of MTF characteristics in a spatial frequency of 20 to 50 Line/mm are several percents or more. In a range in which the value f defocus amount is 300 μm to 400 μm, the value of MTF characteristics in a spatial frequency of 30 to 50 Line/mm is inverted from 0% and false resolution occurs.

Thus, according to the imaging system, the value of MTF characteristics of an image obtained by projecting a subject onto the light receiving surface 21C can always be set to a value larger than 0% (it is possible to prevent the false resolution from occurring) when a taking distance is made to change in a range of 15f to ∞ in an intended state where the positional relationship between the light receiving surface 21C and the imaging lens 10C is fixed.

Moreover, since an effective region of a point image projected onto the light receiving surface 21C when the taking distance is made to change in the range of 15f to ∞ has a size covering three or more pixels on the light receiving surface 21C, the resolution of an image can be improved by executing the restoration processing on any image data obtained by imaging a subject existing at any position. That is, it can be said that all image data obtained through the imaging system of Example 3 satisfies a prerequisite (condition for improving the resolution) for executing the restoration processing.

Thus, by designing the imaging lens 10C such that the focal depth of the imaging lens 10C is large, the resolution of the entire image expressed by image data obtained by simultaneously imaging images of various subjects, which exist in a range of a taking distance of 15f to ∞, can be improved by the restoration processing.

Thus, if the taking distance is limited to the range of 60 mm to ∞, a larger effect of increasing the resolution of an image by executing the restoration processing on image data obtained by imaging an image of a subject can be acquired.

In addition, according to the imaging lens 10C of Example 3 designed as described above, an incidence angle of light incident on the light receiving surface 21C with respect to the light receiving surface 21C can be made small, that is, an imaging lens with good telecentricity can be obtained like the case in Example 1.

<Aberrations of Imaging Lenses in Examples 1 to 3>

Figure 17:
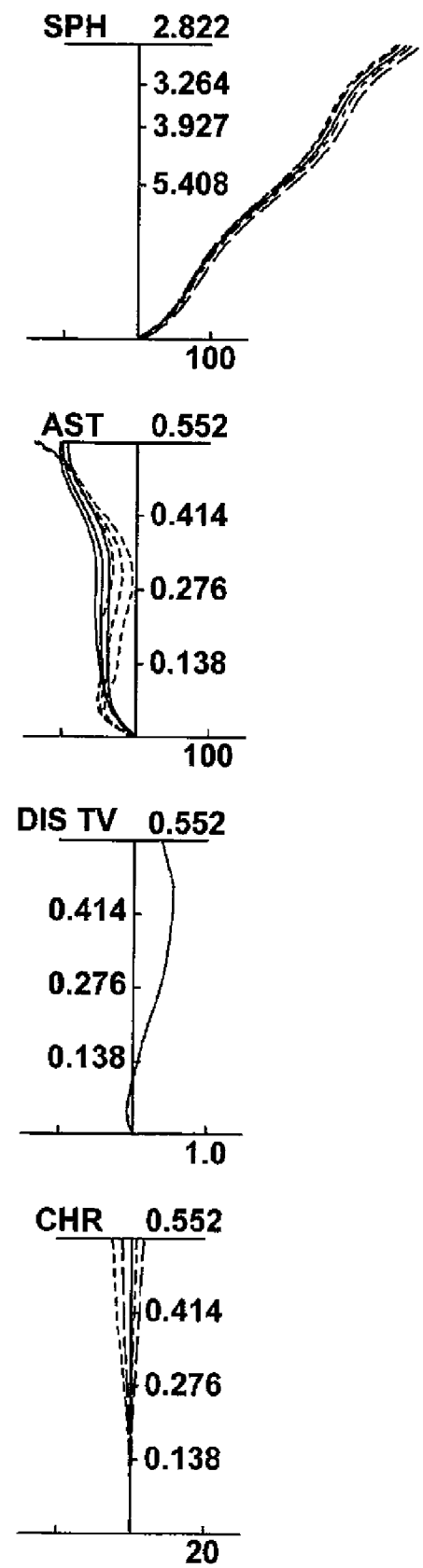
FIG. 17 is a view showing an aberration of an imaging lens in Example 1.
Figure 18:
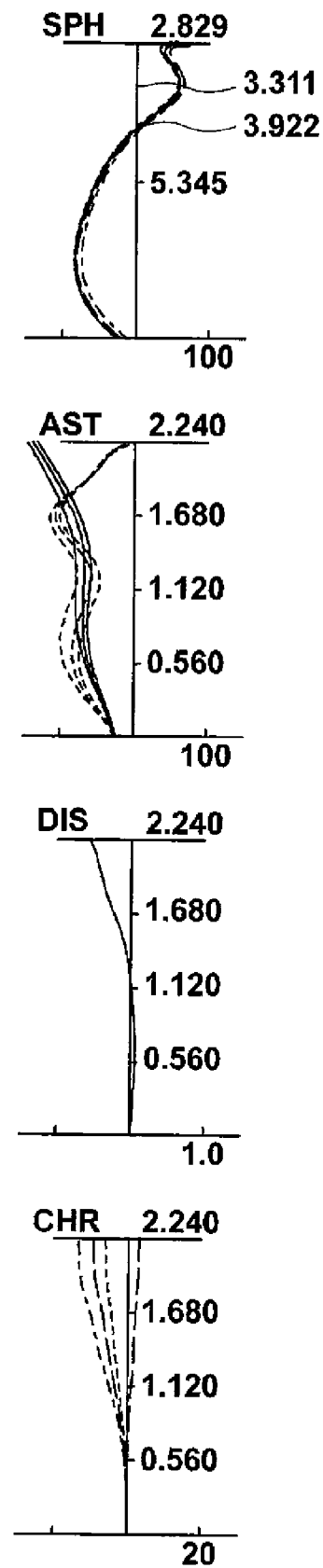
FIG. 18 is a view showing an aberration of an imaging lens in Example 2.
Figure 19:
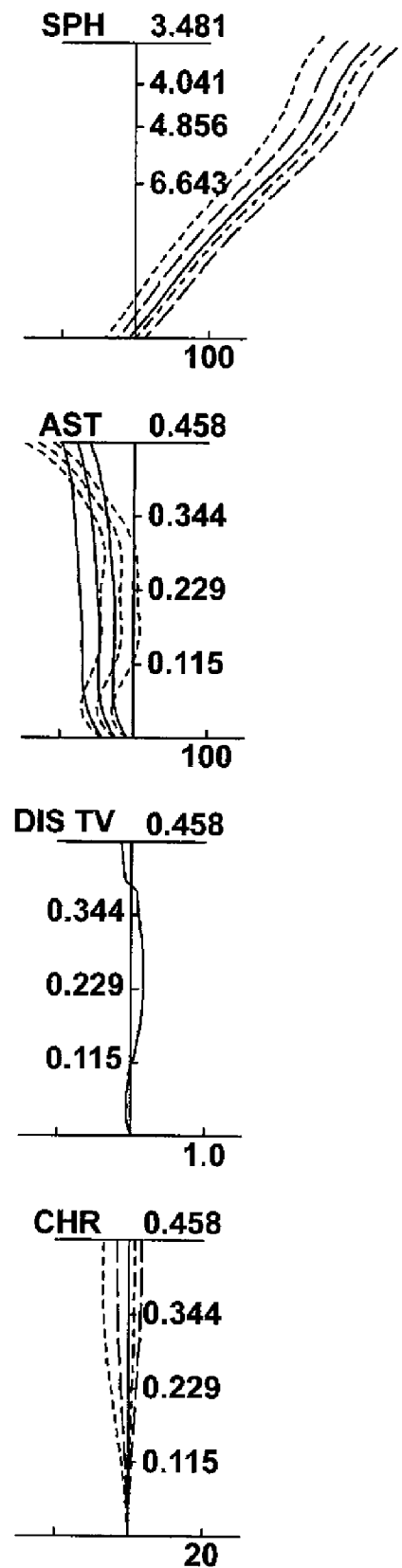
FIG. 19 is a view showing an aberration of an imaging lens in Example 3.

FIG. 17 is a view showing an aberration of the imaging lens 10A, FIG. 18 is a view showing an aberration of the imaging lens 10B, and FIG. 19 is a view showing an aberration of the imaging lens 10C. Each of aberration views of the imaging lenses in Examples 1 to 3 shows spherical aberration, astigmatism, distortion, and lateral chromatic aberration in order from above in FIGS. 17 to 19.

Although each aberration figure shows aberrations at the e-line (wavelength of 546.07 nm) as a reference wavelength, aberrations at the F-line (wavelength of 486.1 nm n) and the C-line (wavelength of 656.3 nm) are also shown in the spherical aberration figure and the lateral chromatic aberration figure. The distortion figure shows an amount of deviation from an ideal image height when the ideal image height is set to f×tan θ using focal length f and half angle of view θ (variable; $0 \leq \theta \leq \Omega$) of the whole system.

<Imaging System of a Comparative Example>

Hereinafter, a known imaging lens used in a portable cellular phone camera and the like will be described as a comparative example.

Figure 20:
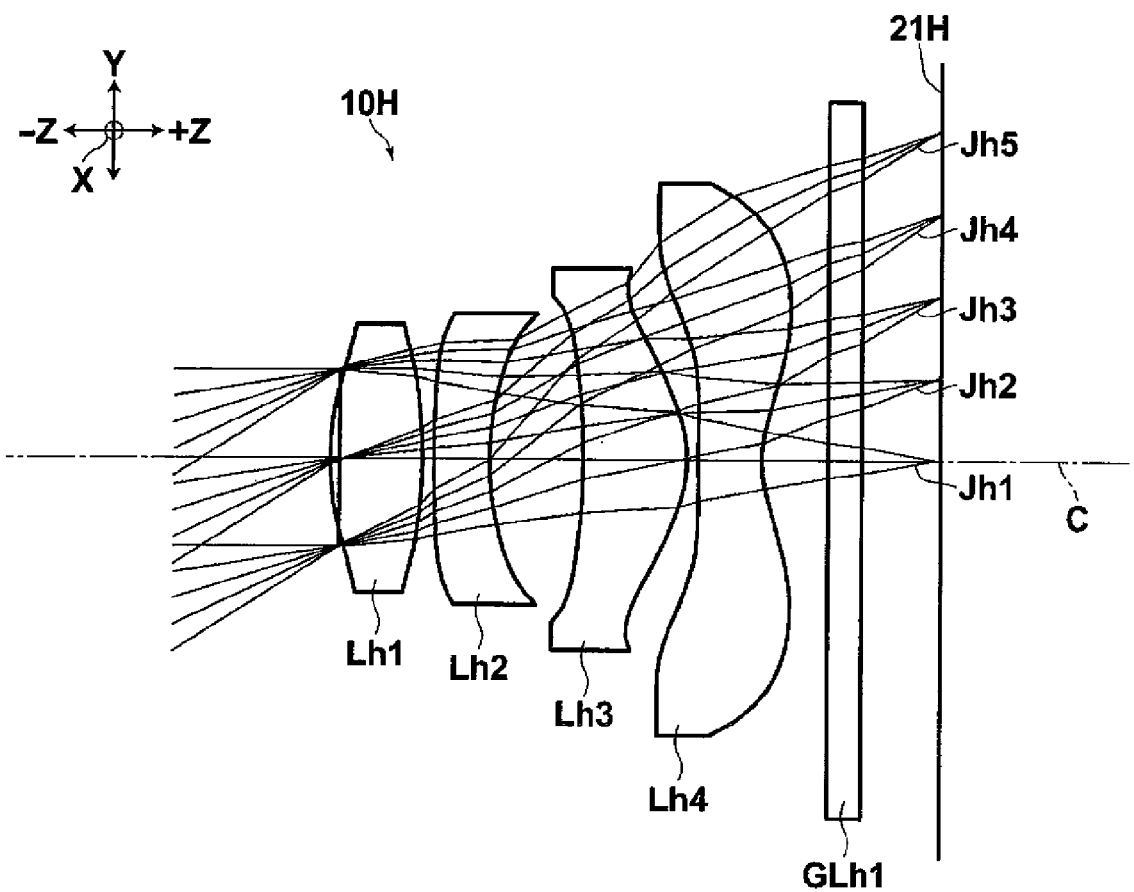
FIG. 20 is a cross-sectional view showing a schematic configuration of an imaging lens disposed in an imaging system in a comparative example.

FIG. 20 is a cross-sectional view showing the schematic configuration of an imaging lens including four single lenses in the comparative example. FIGS. 21A to 21D are views showing a change in a value (%) of MTF characteristics of an optical image projected onto a light receiving surface when the light receiving surface is defocused with respect to the imaging lens onto the coordinates in which the horizontal axis indicates a defocusing amount Ud (μm) in the optical-axis direction (Z-axis direction) of the light receiving surface and the vertical axis indicates the value (%) of MTF characteristics. Here, a defocus range of the light receiving surface is 400 μm.

In addition, FIGS. 21A to 21D showing the MTF characteristics correspond to FIGS. 12A to 12D showing the MTF characteristics regarding the imaging lens 10A.

As shown in FIG. 20, an imaging lens OH in the comparative example has a first single lens Lh1, a second single lens Lh2, a third single lens Lh3, a fourth single lens Lh4, and an optical member GLh1 which are arrayed in order from the subject side (side of −Z direction indicated by arrow in the drawing) along the optical axis C (Z axis). The imaging lens 10H having these four single lenses is designed such that the depth of field increases.

An optical image of a subject is projected onto the light receiving surface 21H through the imaging lens 10H.

In addition, the optical member GLh1 is an optical member which is formed of a parallel plate and does not have power.

Furthermore, in FIG. 20, five light rays Jh1, Jh2, Jh3, Jh4, and Jh5 are shown in order of small image height from the on-axis light ray Jh1 to the off-axis light ray Jh5 incident at a maximum angle of view.

In addition, five MTF curves Mth20 shown in FIG. 21A indicate a change in a value of MTF characteristics in a spatial frequency of 20 Line/mm at each position where the five light rays are projected onto the light receiving surface 21H. Five MTF curves Mth30 shown in FIG. 21B indicate a change in a value of MTF characteristics in a spatial frequency of 30 Line/mm at each position similar to that described above, five MTF curves Mth40 shown in FIG. 21C indicate a change in a value of MTF characteristics in a spatial frequency of 40 Line/mm at each position similar to that described above, and five MTF curves Mth50 shown in FIG. 21D indicate a change in a value of MTF characteristics in a spatial frequency of 50 Line/mm at each position similar to that described above.

For the value of MTF characteristics in the imaging system of the comparative example, when the light receiving surface is made to be close to the imaging lens, that is, when a value of the defocus amount is in a range of approximately 0 to 120 μm in FIGS. 21A to 21D, the value of MTF characteristics in a spatial frequency of 30 to 50 Line/mm is inverted from 0%, resulting in a state where the false resolution occurs. The range in which the false resolution occurs is indicated by arrow Gik in the drawing.

In addition, when the light receiving surface is made to be close to the imaging lens, that is, when a value of the defocus amount is in a range of approximately 280 to 400 μm in FIGS. 21A to 21D, the value of MTF characteristics in a spatial frequency of 30 to 50 Line/mm is inverted from 0%, resulting in a state where the false resolution occurs. The range in which the false resolution occurs is indicated by arrow Gik in the drawing.

Here, the value of MTF characteristics in a range in which a value of the defocus amount Ud is 120 μm to 280 μm (value of focal depth) is a positive value, and a range of fluctuation in value of MTF characteristics in each spatial frequency is about 85% (50 Line/mm), 90% (40 Line/mm), 70% (30 Line 1 mm), and 45% (20 Line/mm).

As described above, according to the imaging system in the comparative example, the value of MTF characteristics is a positive value only in a comparatively narrow defocus range (range of about 160 μm). Accordingly, the amount of fluctuation in the value of MTF characteristics is large.

In a defocus range (indicated by arrow Gik in the drawing) where the value of MTF characteristics is inverted from 0%, a point image has false resolution and an optically meaningful image which can be specified that the effective region covers three or more pixels cannot be obtained.

In other words, only in a considerably limited range of a taking distance, the value of MTF characteristics is a positive value, that is, an image of a subject projected onto the light receiving surface can be made as a meaningful image. In addition, the amount of fluctuation in the size of a point image projected onto the light receiving surface is large.

Moreover, since the imaging system in the comparative example is not constructed such that an effective region of a point image projected onto the light receiving surface when changing the taking distance in a range of 0 to ∞ has a size covering three or more pixels on the light receiving surface, image data obtained through the imaging system does not satisfy a prerequisite (condition for improving the resolution) for executing the restoration processing.

For this reason, even if the restoration processing is performed on the image data obtained by imaging an image of a subject projected onto the light receiving surface 21H through the imaging system in the comparative example, an effect of improving the resolution of the image expressing the subject cannot be acquired.

In addition, cases in which imaging lenses are limited in various kinds of conditions have been described in the examples. However, since an imaging lens having a first lens group, which includes at least one lens and has a positive power, and a second lens group, which includes at least one lens and in which a lens positioned closest to the image side has a negative power, in order from the object side is used as the imaging lens in the imaging system of the invention, the number of lenses included in each group, the shapes of the lenses, and the like are not limited.

What is claimed is:

1. An imaging system comprising:
an imaging lens;
an imaging device that has a light receiving surface on which a plurality of light receiving pixels are arrayed in a two-dimensional manner and that forms first image data based on an optical image of a subject projected onto the light receiving surface through the imaging lens and outputs the first image data corresponding to the subject; and a signal processing section that executes restoration processing on the first image data, the restoration processing being executed to generate second image data equivalent to the first image data output from the imaging device when a resolving power of the imaging lens is higher, wherein the imaging lens comprises: in order from an object side of the imaging lens, a first lens group which includes at least one lens and has a positive power; and a second lens group which includes at least one lens and in which a lens positioned closest to an image side of the imaging lens has a negative power, and the imaging lens and the imaging device are constructed such that a maximum diameter of an effective region of a point image, which is projected onto the light receiving surface through the imaging lens from any position of X, Y, and Z directions, becomes a size covering three or more pixels of the light receiving pixels.

2. The imaging system according to claim 1, wherein the imaging lens is constructed such that a value of MTF is positive, the MTF corresponding to an object located at any position of X, Y, and Z directions distant ten times or more of a focal distance from the imaging lens.

3. The imaging system according to claim 1, wherein the signal processing section performs the restoration processing in a condition where a pixel region covering total nine or more pixels including three or more pixels in a vertical direction and three or more pixels in a horizontal direction on the light receiving surface is set as a minimum unit.

4. The imaging system according to claim 1, wherein the signal processing section executes the restoration processing with a minimum pixel region, which includes an entire effective region of the point image projected onto the light receiving surface, as a minimum unit.

5. The imaging system according to claim 1, wherein the signal processing section executes the restoration processing such that a size of an effective region of the point image in an image expressed by the second image data is smaller than a size of an effective region of the point image in an image expressed by the first image data.

6. The imaging system according to claim 1, wherein the signal processing section executes the restoration processing by utilizing a restoration coefficient corresponding to a state of the point image expressed by the first image data.

7. The imaging system according to claim 6, wherein the restoration coefficient is individually calculated for each corresponding imaging system.

8. The imaging system according to claim 6, wherein the restoration coefficient is selected corresponding to a state of the point image expressed by the first image data among candidates of restoration coefficient corresponding to respective states of point images classified into a plurality of types.

9. The imaging system according to claim 6, wherein the restoration coefficient is obtained by further correction of the restoration coefficient according to a state of the point image expressed by the first image data, the restoration coefficient being selected corresponding to the state of the point image among candidates of a plurality of types of restoration coefficients corresponding to respective states of point images classified into a plurality of types.

10. The imaging system according to claim 6, further comprising a restoration coefficient acquisition section that acquires the restoration coefficient.

11. The imaging system according to claim 1, wherein a lens surface positioned closest to the image side in the second lens group has an off-axis inflection point.

12. The imaging system according to claim 11, wherein a lens surface of a lens positioned closest to the image side in the second lens group satisfies conditional expression (1):

$$0.5H < h < H \qquad (1)$$

wherein H is an effective radius of the lens surface positioned closest to the image side in the second lens group, and h is a distance from an off-axis inflection point of the lens surface positioned closest to the image side in the second lens group to an optical axis of the imaging lens.

13. The imaging system according to claim 1, wherein a lens surface positioned closest to the image side in the second lens group is concave toward the image side at the on-axis of the lens surface and convex toward the image side in a periphery of the lens surface.

14. The imaging system according to claim 1, wherein the imaging lens includes three single lenses.

15. The imaging system according to claim 14, wherein
the first lens group includes two single lenses, wherein one positioned on the object side among the two single lenses has a positive power and an object-side surface of the one is convex toward the object side, and the other positioned on the image side among the two single lenses has an image-side surface convex toward the image side, and
the second lens group includes one single lens.

16. The imaging system according to claim 1, wherein the imaging lens includes four single lenses.

17. The imaging system according to claim 16, wherein
the first lens group includes three single lenses and, wherein a first one positioned closest to the object side among the three single lenses has a positive power and an object-side surface of the first single lens is convex toward the object side, a second one adjacent to the first single lens among the three single lenses has a negative power and an image-side surface of the second single lens is convex toward the image side, and a third one positioned closest to the image side among the three single lenses has a positive power, and
the second lens group includes one single lens.

18. An imaging apparatus comprising an imaging system according to claim 1.

19. A portable terminal apparatus comprising an imaging system according to claim 1.

20. An onboard apparatus comprising an imaging system according to claim 1.

21. A medical apparatus comprising an imaging system according to claim 1.

* * * * *